United States Patent
Zhang et al.

(10) Patent No.: US 11,773,816 B2
(45) Date of Patent: Oct. 3, 2023

(54) PISTON DISCHARGE STRUCTURE FOR PLASMA CLOUD EXCITATION ENGINE

(71) Applicant: BEIJING BDH LASER SCIENCE & TECHNOLOGY INC. LTD., Beijing (CN)

(72) Inventors: Zhiyuan Zhang, Beijing (CN); Jiangxing Wu, Beijing (CN); Weiping Wang, Beijing (CN)

(73) Assignee: BEIJING BDH LASER SCIENCE & TECHNOLOGY INC. LTD., Beijing (CN)

( * ) Notice: Subject to any disclaimer, the term of this patent is extended or adjusted under 35 U.S.C. 154(b) by 0 days.

(21) Appl. No.: 17/329,305

(22) Filed: May 25, 2021

(65) Prior Publication Data

US 2021/0372358 A1    Dec. 2, 2021

(30) Foreign Application Priority Data

May 26, 2020 (CN) .......................... 202010453985.9

(51) Int. Cl.
*F02P 15/04* (2006.01)
(52) U.S. Cl.
CPC .................. *F02P 15/04* (2013.01)
(58) Field of Classification Search
CPC .......... F02P 23/045; F02P 15/04; F02P 9/007; F02P 15/02; F02P 15/08; F02P 23/04; H01T 13/40; H01T 13/54
See application file for complete search history.

(56) References Cited

U.S. PATENT DOCUMENTS 4,561,406 A  * 12/1985  Ward ...................... F02F 1/242
                                                        123/143 B
4,774,914 A  * 10/1988  Ward .................... F02P 23/045
                                                        123/162

(Continued)

FOREIGN PATENT DOCUMENTS

| CN | 106930856 A |   | 7/2017 |   |
| CN | 107061102 A | * | 8/2017 | .............. F02P 23/04 |
| CN | 107218125 A |   | 9/2017 |   |
| DE | 3407951 A1  | * | 7/1985 | .............. F02P 15/04 |

(Continued)

OTHER PUBLICATIONS

DE 3407951 A1 English Translation (Year: 1985).*

(Continued)

*Primary Examiner* — George C Jin
*Assistant Examiner* — Teuta B Holbrook
(74) *Attorney, Agent, or Firm* — Leason Ellis LLP

(57) ABSTRACT

A piston discharge structure for a plasma cloud excitation engine is provided. The piston discharge structure includes a movement electrode, a distributed multi-cavity combustion chamber, a fixed electrode, and a variable interval discharge region. The movement electrode is provided at a top portion of a piston and includes a first combination shape and a first movement electrode structure, the distributed multi-cavity combustion chamber is provided at the top portion of the piston, the fixed electrode is provided at a top portion of a cylinder block or a bottom portion of a cylinder head and including a second combination shape and a second structure, and the variable interval discharge region is defined by the movement electrode and the fixed electrode.

20 Claims, 8 Drawing Sheets

(56) References Cited

U.S. PATENT DOCUMENTS

| | | | | |
|---|---|---|---|---|
| 7,182,076 | B1* | 2/2007 | Minker | F02P 23/045 |
| | | | | 123/162 |
| 7,647,907 | B2* | 1/2010 | Storm | F02P 13/00 |
| | | | | 123/162 |
| 8,424,501 | B2* | 4/2013 | Storm | F02P 13/00 |
| | | | | 123/162 |
| 9,587,618 | B2* | 3/2017 | Ikeda | F02P 3/01 |
| 9,599,089 | B2* | 3/2017 | Ikeda | H01T 13/50 |
| 10,247,163 | B2* | 4/2019 | Kinoshita | F02P 9/007 |
| 2014/0026849 | A1* | 1/2014 | Ikeda | F02B 23/0624 |
| | | | | 123/299 |
| 2014/0216381 | A1* | 8/2014 | Ikeda | H05H 1/46 |
| | | | | 123/143 B |
| 2018/0128233 | A1* | 5/2018 | Kinoshita | F02P 9/00 |
| 2019/0145307 | A1* | 5/2019 | Uchida | F02B 31/00 |
| | | | | 123/301 |

FOREIGN PATENT DOCUMENTS

| | | | | | |
|---|---|---|---|---|---|
| DE | 19638787 | A1 | * | 4/1998 | F02P 23/045 |
| DE | 10143194 | A1 | * | 3/2003 | F02P 15/04 |
| GB | 2241746 | A | * | 9/1991 | F02B 43/10 |
| JP | S63501520 | A | | 6/1988 | |
| JP | 2006132518 | A | * | 5/2006 | F02P 23/045 |
| JP | 2006132518 | A1 | | 5/2006 | |
| JP | 2017180269 | A | | 10/2017 | |
| JP | 2020037895 | A | | 3/2020 | |
| KR | 20110062146 | A | | 6/2011 | |
| KR | 20160118063 | A | * | 10/2016 | |

OTHER PUBLICATIONS

CN 107061102 A—English translation (Year: 2017).*
Extended European Search Report for corresponding European Application No. 21175791.9, dated Sep. 9, 2021. 7 pages.

* cited by examiner

PISTON DISCHARGE STRUCTURE FOR PLASMA CLOUD EXCITATION ENGINE

The present patent application claims priority to Chinese patent application No. 202010453985.9, filed on May 26, 2020. For all purposes, the entire disclosure of the aforementioned patent application is incorporated herein by reference as part of the disclosure of the present patent application.

TECHNICAL FIELD

At least one embodiment of the present disclosure relates to a piston discharge structure for a plasma cloud excitation engine.

BACKGROUND

In the world nowadays, with the rapid development of productive forces, energy consumption is increasing day by day, disposable energy is gradually exhausted, and the continuous deterioration of ecological environment seriously threatens human survival. "Protecting ecological environment and building a green and beautiful home together" has become an urgent task. Power combustion technology will conform to the requirements of the era, and develop towards "green combustion" with clean fuel, refined combustion, intelligent control, higher efficiency, energy saving, and lower emission.

SUMMARY

At least one embodiment of the present disclosure provides a piston discharge structure for a plasma cloud excitation engine. The piston discharge structure includes a movement electrode, a distributed multi-cavity combustion chamber, a fixed electrode, and a variable interval discharge region. The movement electrode is provided at a top portion of a piston and includes a first combination shape and a first movement electrode structure, the distributed multi-cavity combustion chamber is provided at the top portion of the piston, the fixed electrode is provided at a top portion of a cylinder block or a bottom portion of a cylinder head and comprising a second combination shape and a second structure, and the variable interval discharge region is defined by the movement electrode and the fixed electrode.

For example, in the piston discharge structure provided by at least one embodiment of the present disclosure, the movement electrode comprises at least one first discharge electrode, the movement electrode comprises at least one first discharge electrode, the at least one first discharge electrode is provided at the top portion of the piston and comprises the first combination shape and the first movement electrode structure, the at least one first discharge electrode is integrated with the piston, and the at least one first discharge electrode is configured to reciprocate with the piston, the piston is connected with a crank connection rod of the engine, and the piston is connected with a common ground through the crank connection rod of the engine, a shape of the at least one first discharge electrode is the same as a shape of the fixed electrode, and an axis of the shape of the at least one first discharge electrode is coincident with an axis of the shape of the fixed electrode.

For example, in the piston discharge structure provided by at least one embodiment of the present disclosure, the movement electrode comprises at least one group of open discharge rings, the at least one group of open discharge rings is provided on the top portion of the piston and concentric with a geometric center of a top surface of the piston, and the top surface of the piston comprises an end surface, facing the fixed electrode, of the top portion of the piston, the at least one group of open discharge rings comprises a first innermost discharge ring, a first outermost discharge ring, and at least one first intermediate discharge ring located between the first innermost discharge ring and the first outermost discharge ring, the first innermost discharge ring is provided with a first height, a cross section of the first innermost discharge ring along a radial direction is in a trapezoidal shape with an upper end and a lower end that is wider than the upper end, and an upper surface of the first innermost discharge ring comprises a discharge surface, an upper surface of the at least one first intermediate discharge ring comprises a discharge surface, an upper surface of the first outermost discharge ring comprises a discharge surface, the discharge surface of the first innermost discharge ring simultaneously serves as the top surface of the piston, and a plurality of discharge surfaces of the at least one group of open discharge rings are equal in height and parallel to each other.

For example, in the piston discharge structure provided by at least one embodiment of the present disclosure, a width of each open discharge ring of the at least one group of open discharge rings in the radial direction of the at least one group of open discharge rings ranges from 0.5 mm to 5 mm, a distance between an inner side of the first innermost discharge ring and the geometric center of the top surface of the piston ranges from 1 mm to 9.5 mm, and a distance from an outer side of the first innermost discharge ring to an inner side of a first intermediate discharge ring immediately adjacent to the first innermost discharge ring is two times as large as the distance between the inner side of the first innermost discharge ring and the geometric center of the top surface of the piston, a distance between two sides, facing each other, of two adjacent discharge rings of the at least one group of open discharge rings is two times as large as the distance between the inner side of the first innermost discharge ring and the geometric center of the top surface of the piston, a distance between an outer side of the first outermost discharge ring and an inner edge of a top land of the piston is equal to the distance between the inner side of the first innermost discharge ring and the geometric center of the top surface of the piston.

For example, in the piston discharge structure provided by at least one embodiment of the present disclosure, the movement electrode further comprises a plurality of notches, and the plurality of notches are distributed on the at least one group of open discharge rings in a way of equally dividing a circumference, and a width of each notch of the plurality of notches ranges from 2 mm to 10 mm, a total number of at least one notch on each discharge ring of the at least one group of open discharge rings increases from the first innermost discharge ring to the first outermost discharge ring in a manner of one ring by one ring, and the at least one notch on the first innermost discharge ring is aligned along a radial direction of the first innermost discharge ring to the at least one notch on each discharge ring of the at least one group of open discharge rings, a first intermediate discharge ring immediately adjacent to the first innermost discharge ring is further provided with at least one notch staggered from the at least one notch on the first innermost discharge ring, and a total number of the at least one notch further provided on the first intermediate discharge ring immediately adjacent to the first innermost discharge ring is the same as a total number of the at least one notch on the first innermost discharge ring, the first outermost discharge ring is further provided with at least one notch which is staggered from the at least one notch on the first intermediate discharge ring immediately adjacent to the first outermost discharge ring, and a total number of the at least one notch further provided on the first outermost discharge ring is the same as a total number of the at least one notch on the first intermediate discharge ring immediately adjacent to the first outermost discharge ring.

For example, in the piston discharge structure provided by at least one embodiment of the present disclosure, the distributed multi-cavity combustion chamber comprises a downwards concave region at an inner side of the first outermost discharge ring, between two adjacent discharge rings of the at least one group of open discharge rings, and at an outer side of the first outermost discharge ring, the distributed multi-cavity combustion chamber comprises a combustion chamber main cavity and a combustion chamber auxiliary cavity, the combustion chamber main cavity comprises a flat to-shaped downwards concave region at the inner side of the first outermost discharge ring, a diameter of the downwards concave region of the combustion chamber main cavity is two times as large as the distance between the inner side of the first innermost discharge ring and the geometric center of the top surface of the piston, and a maximum depth of the combustion chamber main cavity ranges from 0.5 mm to 5 mm.

For example, in the piston discharge structure provided by at least one embodiment of the present disclosure, the piston discharge structure further comprises an extrusion flow guide protrusion and an extrusion flow guide protrude ridge, the extrusion flow guide protrusion is provided at a downwards concave downwards center of the combustion chamber main cavity, the concave downwards center coincides with the geometric center of the top surface of the piston, a cross section of the extrusion flow guide protrusion along a longitudinal direction is bell-shaped, an area of a bottom surface of the extrusion flow guide protrusion is 20%-50% of an area of a bottom surface of the combustion chamber main cavity, and a height of the extrusion flow guide protrusion is 50%-70% of a maximum depth of the combustion chamber main cavity.

For example, in the piston discharge structure provided by at least one embodiment of the present disclosure, the combustion chamber auxiliary cavity comprises a downwards concave region, which has a spherical shape along the radial direction of the first outermost discharge ring and is located between two adjacent discharge rings of the at least one group of open discharge rings and at the outer side of the first outermost discharge ring, and a concave depth of the combustion chamber auxiliary cavity gradually increases from a top land of the piston to the geometric center of the top surface of the piston, and the concave depth of the combustion chamber auxiliary cavity is 30%-70% of the maximum depth of the combustion chamber main cavity.

For example, in the piston discharge structure provided by at least one embodiment of the present disclosure, the extrusion flow guide protrude ridge is provided at a crossing position between the combustion chamber auxiliary cavity and the plurality of notches of the movement electrode, the extrusion flow guide protrude ridge is at a center of the crossing position, a length direction of the extrusion flow guide protrude ridge is along the radial direction of the at least one group of open discharge rings, and a width direction of the extrusion flow guide protrude ridge is along a circumferential direction of the at least one group of open discharge rings, the extrusion flow guide protrude ridge is provided with a bell-shaped cross section, a ridge height of the extrusion flow guide protrude ridge is 30%-70% of the maximum depth of the combustion chamber main cavity, both sides of the extrusion flow guide protrude ridge in the length direction of the of the extrusion flow guide protrude ridge are symmetrically or asymmetrically provided with guide slopes, and both sides of the extrusion flow guide protrude ridge in the width direction of the of the extrusion flow guide protrude ridge are symmetrically or asymmetrically provided with guide slopes.

For example, in the piston discharge structure provided by at least one embodiment of the present disclosure, the fixed electrode comprises at least one second discharge electrode, and the least one second discharge electrode is fixed on the top portion of the cylinder block or the bottom portion of the cylinder head and comprises the second combination shape and the second structure, the at least one second discharge electrode is right above the movement electrode, and an end surface of the at least one second discharge electrode facing the discharge surface of the movement electrode comprises a discharge surface, in a case where the movement electrode is at a position at top dead center, a fixed gap is provided between the at least one second discharge electrode and the movement electrode in a direction perpendicular to the fixed electrode, the at least one second discharge electrode is configured to be connected with an external power supply, a shape of the at least one second discharge electrode is the same as a shape of the movement electrode, and an axis of the shape of the at least one second discharge electrode is coincident with an axis of the shape of the movement electrode.

For example, in the piston discharge structure provided by at least one embodiment of the present disclosure, the fixed electrode comprises one group of closed-circle discharge rings, the one group of closed-circle discharge rings is geometrically centered with the at least one group of open discharge rings of the movement electrode and comprises a second innermost discharge ring, a second outermost discharge ring, and at least one second intermediate discharge ring located between the second innermost discharge ring and the second outermost discharge ring, a thickness of the second innermost discharge ring ranges from 1 mm to 8 mm, a cross section of the second innermost discharge ring is in a rectangular shape, an end surface of the second innermost discharge ring facing the discharge surface of the first innermost discharge ring is provided as a discharge surface, and the end surface of the second innermost discharge ring is parallel to the upper surface of the first innermost discharge ring, center lines of the end surface of the second innermost discharge ring and the upper surface of the first innermost discharge ring are aligned with each other, and a width of the second innermost discharge ring ranges from 0.2 mm to 4 mm, the piston discharge structure further comprises at least one cylindrical feed connection port, a plurality of groups of linear radially connected inductors, and a plurality of curved fixed support inductors.

For example, in the piston discharge structure provided by at least one embodiment of the present disclosure, in a case where the at least one cylindrical feed connection port is provided at the center of the movement electrode, the at least one cylindrical feed connection port comprises a cylinder with a thread, a bayonet base or a plug-in interface, and both a thickness and a diameter of the at least one cylindrical feed connection port range from 3 mm to 10 mm, a thickness of each linear radially connected inductor of the plurality of groups of linear radially connected inductors is 60%-85% of the thickness of the second innermost discharge ring, and the thickness of each linear radially connected inductor of the plurality of groups of linear radially connected inductors ranges from 1 mm to 9 mm, the plurality of groups of linear radially connected inductors comprise a first group of linear radially connected inductors communicated with the at least one cylindrical feed connection port and the second innermost discharge ring, and at least one second group of linear radially connected inductors communicated with every two adjacent closed-circle discharge rings of the one group of closed-circle discharge rings, a total number of each group of linear radially connected inductors of the plurality of groups of linear radially connected inductors is different, numbers of groups of linear radially connected inductors of the plurality of groups of linear radially connected inductors are doubled group by group along a direction from the top land of the piston toward the geometric center direction of the top surface of the piston, and each group of linear radially connected inductors of the plurality of groups of linear radially connected inductors are distributed in a staggered manner within each group and in a manner of equally dividing a circumference, a thickness and a width of each curved fixed support inductor of the plurality of curved fixed support inductors range from 1 mm to 9 mm, and the plurality of curved fixed support inductors are distributed in an equal circumferential way, one end of each curved fixed support inductor of the plurality of curved fixed support inductors is connected with the second outermost discharge ring, and another end of each curved fixed support inductor of the plurality of curved fixed support inductors is provided with a wire hole or a through hole and is fastened on the top portion of the cylinder block or the bottom portion of the cylinder head; or in a case where the at least one cylindrical feed connection port is provided at one of crossing positions between the second outermost discharge ring and the second group of linear radially connected inductors connected with the second outermost discharge ring, the at least one cylindrical feed connection port is provided as a threaded or bayonet base or plug-in interface, and the plurality of groups of linear radially connected inductors are communicated with the one group of closed-circle discharge rings and cross at a center of the one group of closed-circle discharge rings, the plurality of curved fixed support inductors are distributed in a manner of equally dividing a circumference, one end of each curved fixed support inductor of the plurality of curved fixed support inductors is connected with the second outermost discharge ring, and another end of each curved fixed support inductor of the plurality of curved fixed support inductors is provided with a wire hole or a through hole and is fastened on the top portion of the cylinder block or the bottom portion of the cylinder head.

For example, in the piston discharge structure provided by at least one embodiment of the present disclosure, the variable interval discharge region is provided between the discharge surface of the first innermost discharge ring and the discharge surface of the second innermost discharge ring, and according to different positions or moments in a case where the discharge surface of the first innermost discharge ring moves with the piston, the variable interval discharge region is further subdivided into a first pre-ionization region, a second ionization region, and a third enhanced combustion region, a length of the first pre-ionization region in a direction perpendicular to the discharge surface of the first innermost discharge ring is greater than a length of the third enhanced combustion region in the direction perpendicular to the discharge surface of the first innermost discharge ring, and the length of the third enhanced combustion region in the direction perpendicular to the discharge surface of the first innermost discharge ring is greater than a length of the second ionization region in the direction perpendicular to the discharge surface of the first innermost discharge ring.

For example, in the piston discharge structure provided by at least one embodiment of the present disclosure, the length of the first pre-ionization region in the direction perpendicular to the discharge surface of the first innermost discharge ring ranges from 0.2 mm to 1 mm, the length of the second ionization region in the direction perpendicular to the discharge surface of the first innermost discharge ring ranges from 0.02 mm to 0.09 mm, and the length of the third enhanced combustion region in the direction perpendicular to the discharge surface of the first innermost discharge ring ranges from 0.1 mm to 0.5 mm.

For example, in the piston discharge structure provided by at least one embodiment of the present disclosure, in a case where a diameter of the piston is less than or equal to 20 mm, the movement electrode comprises one open discharge ring, an upper surface of the one open discharge ring comprises a discharge surface, and a width of the discharge surface of the one open discharge ring along a radial direction of the open discharge ring ranges from 0.3 mm to 2 mm, the one open discharge ring comprises three notches, the three notches are distributed on the open discharge ring in a manner of equally dividing a circumference, and a width of each notch of the three notches ranges from 2 mm to 5 mm, a distance between an inner side of the one open discharge ring and the geometric center of the top surface of the piston ranges from 1 mm to 3 mm, a distance between an outer side of the one open discharge ring and an inner edge of a top land of the piston is equal to a distance between the inner side of the one open discharge ring and the geometric center of the top surface of the piston, and the top surface of the piston comprises an end surface, facing the fixed electrode, of the top portion of the piston.

For example, in the piston discharge structure provided by at least one embodiment of the present disclosure, the distributed multi-cavity combustion chamber is in a distributed two-cavity structure, and the distributed two-cavity structure comprises a combustion chamber main cavity and a combustion chamber auxiliary cavity, the combustion chamber main cavity comprises a spherical downwards concave region at the inner side of the open discharge ring, a diameter of the combustion chamber main cavity ranges from 2 mm to 5 mm, and a maximum depth of the combustion chamber main cavity ranges from 0.2 mm to 2 mm, the combustion chamber auxiliary cavity comprises a downwards concave region with a spherical shape arranged from the outer side of the one open discharge ring to the inner edge of the top land, and a concave depth of the combustion chamber auxiliary cavity is 5%-40% of the maximum depth of the combustion chamber main cavity.

For example, in the piston discharge structure provided by at least one embodiment of the present disclosure, the fixed electrode comprises one closed-circle discharge ring, the one closed-circle discharge ring has a same geometric center as the one open discharge ring, a thickness of the one closed-circle discharge ring ranges from 1 mm to 10 mm, a cross section of the one closed-circle discharge ring is in a rectangular shape, an end surface of the one closed-circle discharge ring facing the discharge surface of the one open discharge ring comprises a discharge surface, and a width of the discharge surface of the one closed-circle discharge ring ranges from 0.2 mm to 2 mm.

For example, in the piston discharge structure provided by at least one embodiment of the present disclosure, the piston discharge structure further comprises at least one cylindrical feed connection port, a plurality of linear radially connected inductors, and a plurality of curved fixed support inductors, in a case where the at least one cylindrical feed connection port is arranged at a center of the one closed-circle discharge ring, the at least one cylindrical feed connection port is a cylinder with a thread or a bayonet base or a plug-in interface, a thickness of each cylindrical feed connection port of the at least one cylindrical feed connection port is equal to the thickness of the one closed-circle discharge ring, a diameter of each cylindrical feed connection port of the at least one cylindrical feed connection port ranges from 2 mm to 3 mm, a total number of the linear radially connected inductors is three or four, a thickness of each linear radially connected inductor of the plurality of the linear radially connected inductors is 60%-85% of the thickness of the one closed-circle discharge ring, a width of each linear radially connected inductor of the plurality of the linear radially connected inductors ranges from 1 mm to 3 mm, and the plurality of linear radially connected inductors are distributed between the one closed-circle discharge ring and the at least one cylindrical feed connection port in a manner of equally dividing a circumference, and the plurality of linear radially connected inductors are communicated with the at least one cylindrical feed connection port and the one closed-circle discharge ring, a total number of the curved fixed support inductors is three, a thickness of each curved fixed support inductor of the plurality of curved fixed support inductors is equal to the thickness of the one closed-circle discharge ring, a width of each of the plurality of curved fixed support inductors ranges from 1 mm to 9 mm, the plurality of curved fixed support inductors are distributed at the top portion of the cylinder block or the bottom portion of the cylinder head in a manner of equally dividing a circumference, one end of each curved fixed support inductor of the plurality of curved fixed support inductors is connected with the one closed-circle discharge ring, and another end of each curved fixed support inductor of the plurality of curved fixed support inductors is provided with a wire hole or a through hole and is fastened on the top portion of the cylinder block or the bottom portion of the cylinder head; or in a case where the at least one cylindrical feed connection port is arranged at one of crossing positions between the one closed-circle discharge ring and the plurality of linear radially connected inductors, and the at least one cylindrical feed connection port comprises a threaded or a bayonet base or a plug-in interface, a total number of the plurality of linear radially connected inductors is three or four, and a total number of the plurality of linear radially connected inductors is distributed at the inner side of the one closed-circle discharge ring in a manner of equally dividing a circumference, and the plurality of linear radially connected inductors cross at the center of the one closed-circle discharge ring, a total number of the plurality of curved fixed support inductors is three, and the plurality of curved fixed support inductors are distributed on the top portion of the cylinder block or the bottom portion of the cylinder head in a manner of equally dividing a circumference, one end of each curved fixed support inductor of the plurality of curved fixed support inductors is connected with the one closed-circle discharge ring, and another end of each curved fixed support inductor of the plurality of curved fixed support inductors is provided with a wire hole or a through hole and is fastened on the top portion of the cylinder block or the bottom portion of the cylinder head.

For example, in the piston discharge structure provided by at least one embodiment of the present disclosure, the variable interval discharge region comprises a variable interval discharge region between the discharge surface of the one open discharge ring of the movement electrode and the discharge surface of the one closed discharge ring of the fixed electrode, according to different positions or moments in a case where the discharge surface of the one open discharge ring of the movement electrode moves along with the piston, the variable interval discharge region is subdivided into a first pre-ionization region, a second ionization region, and a third enhanced combustion region, a length of the first pre-ionization region in a direction perpendicular to the discharge surface of the first innermost discharge ring is greater than a length of the third enhanced combustion region in the direction perpendicular to the discharge surface of the first innermost discharge ring, and the length of the third enhanced combustion region in the direction perpendicular to the discharge surface of the first innermost discharge ring is greater than a length of the second ionization region in the direction perpendicular to the discharge surface of the first innermost discharge ring.

For example, in the piston discharge structure provided by at least one embodiment of the present disclosure, a length of the first pre-ionization region in a direction perpendicular to the one open discharge ring of the movement electrode ranges from 0.2 mm to 1 mm, a length of the second ionization region in the direction perpendicular to the one open discharge ring of the movement electrode ranges from 0.02 mm to 1 mm, and a length of the third enhanced combustion region in the direction perpendicular to the one open discharge ring of the movement electrode ranges from 0.1 mm to 0.5 mm.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure.

DETAILED DESCRIPTION

Figure 1A:
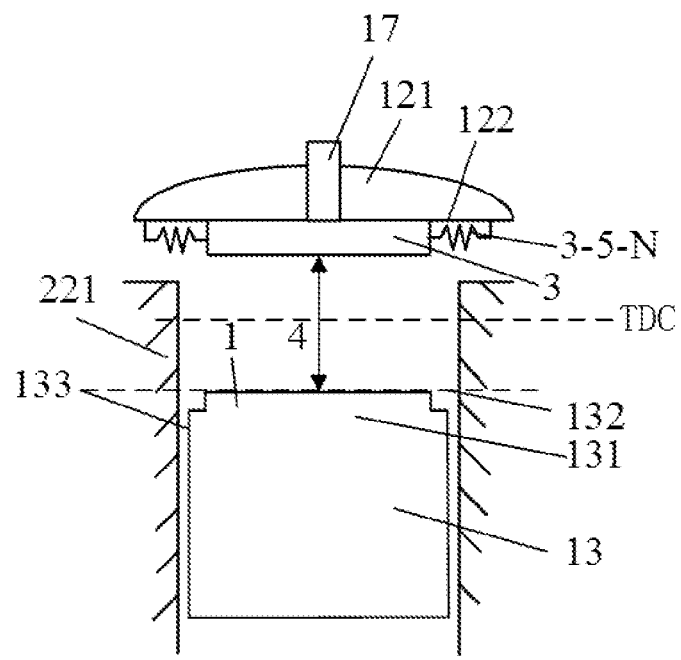
FIG. 1A is a schematic diagram of a piston discharge structure provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," "third," "fourth," etc., which are used in the description and the claims of the present application for disclosure, are not intended to indicate any sequence, amount or importance, but distinguish various components. Similarly, similar terms such as "a", "an", or "the", etc., do not indicate the limitation of quantity, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

It is common knowledge that combustion is a complex process of dynamic coupling and interaction of physical and chemical changes. Flame is a weak ionization phenomenon, and heat conduction and molecular diffusion are important factors for normal flame propagation. Early experiments have proved that the ions in flame accelerate and drive neutral particles to move to form flocculent flow under the action of a strong electromagnetic field. Different from thermal combustion, dynamic combustion converts the chemical energy of fuel into mechanical energy (kinetic energy) to do work. Therefore, dynamic combustion has the basic characteristics of intermittent (pulse) type, small displacement, short time (the minimum reaches the order of millisecond), and limited space (cylinder constraint), etc. The first step of energy conservation and emission reduction is to maximize the transformation of energy forms.

Throughout the development course of internal combustion engine for more than 100 years, the technology is constantly improved, but there are still the following problems: (1) the traditional ignition mode of ignition or compression ignition determines the structure of a combustion chamber. Although there are some improvements to divide the combustion chamber into a main cavity and an auxiliary cavity, the main cavity is designed into many shapes, such as low vortex thin disk type, middle vortex disk type, to-shaped type, concave type, strong vortex M-shaped type, etc., but combustion chambers are characterized by a "single cavity type" structure, which has been proved difficult to achieve ideal multiple homogeneous ignition and combustion. (2) Just in the important link of combustion, the traditional design concept adopts a simple way of "no matter after ignition or compression ignition", without considering the whole process management of intermittent (pulse) combustion, especially without deeply considering the influence of dynamic changes of important parameters such as gas molecular density, pressure gradient, temperature gradient, and oxygen concentration, etc., in the combustion development process, and without putting forward corresponding effective solutions. Of course, it is impossible to consider the influence of dynamic change of parameters with the existing combustion chamber shape, ignition device or compression ignition device, and ignition mode. (3) Many existing technologies that use plasma ignition (striking) are limited to the old technical routines of "spark ignition (striking)" and "no matter after ignition or compression ignition", without fundamental technological innovation. (4) Driven by the increasingly stringent standards of energy conservation and emission reduction, the world's major auto companies pay more attention to new combustion technologies than before, and a Homogeneous Charge Compression Ignition (HCCI) technology has emerged as the times require and become a trend, with ignition and compression ignition showing a trend towards homogeneous compression ignition. Up to now, many versions of premixed compression combustion ignition (PCCI) engine and composite combustion spark (CCS) engine, etc., have been introduced. However, after using the above-mentioned engines in practice, it is found that HCCI operation mode can achieve reliable compression ignition and combustion only in the narrow middle load section within the full load range of the engine, but cannot achieve reliable compression ignition at all in the low load section and high load section and let alone ideal combustion, and even combustion is difficult. Therefore, this technical innovation has to be abandoned in the case where idling (or starting), fast acceleration and high speed operation are performed, and the traditional spark plug ignition is used as a supplement. Therefore, the available version of HCCI cannot fundamentally solve the problem of more efficient energy saving and emission reduction by power combustion, but it is only a compromise solution, and its effect is far from the original intention of design.

To sum up, there is still much space for development of internal combustion engine technology, and it is necessary to further explore deeper technical improvement. The available market also urgently needs the improvement of internal combustion engine technology.

In order to achieve the following goals: (1) pursuing multiple homogeneous fires in the true sense on the basis of "homogeneity", and further pursuing ideal combustion with short combustion delay, normal reaction rate, uniform development state, no residue detection, and high work efficiency, and the ideal combustion is changed to "homogeneous combustion" for short. (2) Combining the characteristics of piston movement, a special discharge structure and the cavity shape of combustion chamber are designed, which breaks through the traditional idea that electric energy is only used for ignition. By adopting a method of "surface discharge", the discharge energy (ionization degree) and timing (or moment) are accurately controlled, and the discharge is carried out under different ionization intensities and in multiple steps. Firstly, the low-pressure premixed gas in the compression process is pre-ionized to improve the motion activity of gas molecules, and then the compressed high-pressure premixed gas is ionized to generate a large-volume plasma cloud (body) with a set shape. Utilizing the radiation effects of light energy, ray energy, electromagnetic energy, heat energy, etc. of the plasma cloud (body), that is, cloud excitation, multiple homogeneous ignition can be realized reliably, and the double optimal conditions of "self-ignition temperature plus plasma cloud excitation" which are more favorable than a mode of single "self-ignition temperature" are provided for the start and development of combustion. (3) Innovating the old technical routine of "no matter after ignition or compression ignition", and implementing a precise and fine control to the whole process and the whole region (combustion chamber) in a space dimension and a time dimension for an intermittent (pulse) combustion. Especially, in a middle stage and a later stage of the combustion development, moderate discharge energy is maintained to enhance combustion and realize a "homogeneous combustion" state, thus providing necessary "soft conditions" of electromagnetic energy field. (4) In order to match the special discharge structure, the cavity shape of the combustion chamber is innovated, and the original "single cavity" is improved into a "distributed multi-cavity" structure, which provided necessary "hard conditions" for the mechanical structure in order to reliably realize the ideal multiple homogeneous ignition and combustion and avoid the occurrence of deflagration. (5) Fully implementing the above-mentioned technological innovation ideas. If these fundamental reforms are not adhered to, the existing electric spark plug, compression ignition device, combustion chamber structure, and working mode cannot achieve "whole-process and whole-region control" at all, and the ideal multiple homogeneous ignition and combustion cannot be realized. (6) Maximizing the combustion efficiency, burn-out rate and effective work, meet more stringent standards for energy conservation and emission reduction, provide practical technical solutions for the research and development of new generation engines, and lay a solid industrial foundation.

At least one embodiment of the present disclosure provides a piston discharge structure for a plasma cloud excitation homogeneous charge uniform combustion engine, the piston discharge structure includes a movement electrode, a distributed multi-cavity combustion chamber, a fixed electrode, and a variable interval discharge region. The movement electrode is arranged at a top portion of a piston and includes a first combination shape and a first movement electrode structure, the distributed multi-cavity combustion chamber is arranged at the top portion of the piston, the fixed electrode is arranged at a top portion of a cylinder block or a bottom portion of a cylinder head and includes a second combination shape and a second structure, and the variable interval discharge region is defined by the movement electrode and the fixed electrode.

The piston discharge structure for the plasma cloud exciting homogeneous charge uniform combustion engine provided by the embodiments of the present disclosure is referred to as "cloud engine" or PEHCUC for short, and the working principle of the piston discharging structure is different from the working principle of the related homogeneous charge compression ignition technology. The piston discharge structure can realize multiple homogeneous ignition and homogeneous combustion of the engine, greatly improve the combustion efficiency and meet higher energy-saving emission standards, and also has the following technical effects: full gas phase premixing, accurate control of the whole combustion process in the whole combustion chamber area, pre-ionization to improve the motion activity of premixed gas molecules, plasma cloud exciting of multiple ignition and combustion, post-ionization to enhance combustion development, and no detection of combustion residues.

In the following, embodiments of the present disclosure and some examples thereof will be described in detail with reference to the accompanying drawings.

Figure 1B:
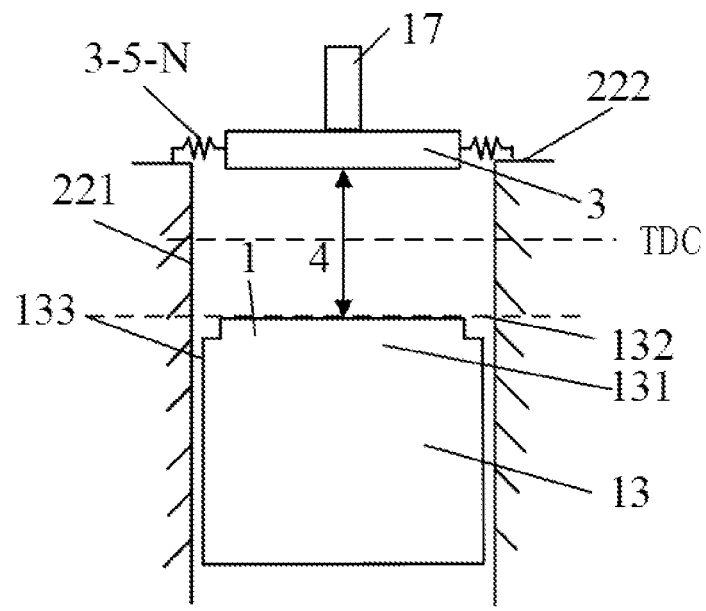
FIG. 1B is a schematic diagram of a piston discharge structure provided by at least another embodiment of the present disclosure.
Figure 1C:
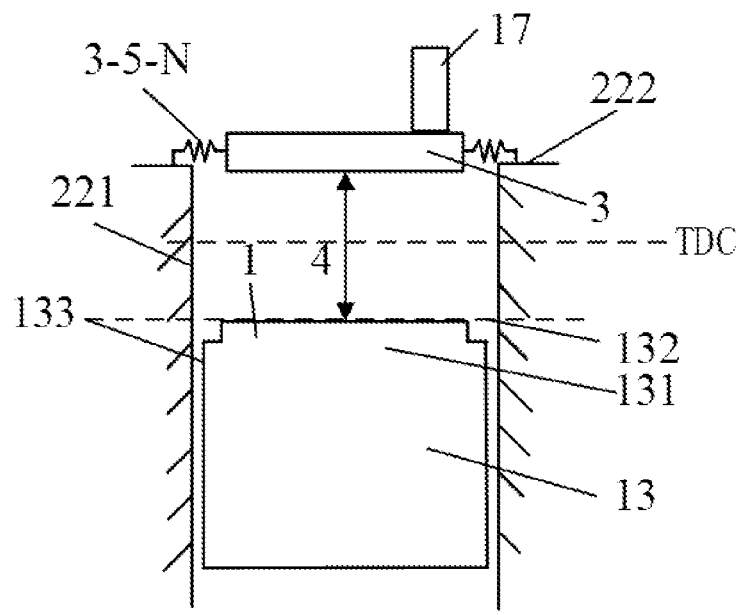
FIG. 1C is a schematic diagram of a piston discharge structure provided by at least still another embodiment of the present disclosure.

FIG. 1A is a schematic diagram of a piston discharge structure provided by at least one embodiment of the present disclosure; FIG. 1B is a schematic diagram of a piston discharge structure provided by at least another embodiment of the present disclosure; FIG. 1C is a schematic diagram of a piston discharge structure provided by at least still another embodiment of the present disclosure.

For example, as shown in FIG. 1A, FIG. 1B, and FIG. 1C, the piston discharge structure includes a movement electrode 1, a distributed multi-cavity combustion chamber 2, a fixed electrode 3, and a variable interval discharge region 4. The movement electrode 1 is arranged at a top portion 131 of a piston 13 and includes a first combination shape and a first movement electrode structure. The distributed multi-cavity combustion chamber 2 is arranged at the top portion 131 of the piston 13, and the distributed multi-cavity combustion chamber 2 is formed by a top surface 132 of the piston and the first movement electrode structure of the movement electrode 1. The fixed electrode 3 may be arranged at a top portion 222 of a cylinder block 221 (as illustrated in FIG. 1B and FIG. 1C), and may be arranged at a bottom portion 122 of a cylinder head 121 (as illustrated in FIG. 1A). The fixed electrode 3 and the movement electrode 1 face each other in a direction perpendicular to the piston 13, so that a discharge phenomenon occurs between end surfaces opposite to each other of the fixed electrode 3 and the movement electrode 1 during an operation process of the engine. The variable interval discharge region 4 is defined by the movement electrode 1 and the fixed electrode 3, that is, the variable interval discharge region 4 is a space between the movement electrode 1 and the fixed electrode 3, and gas in the variable interval discharge region 4 is ionized, thereby generating plasma gas flow. This piston discharge structure can realize multiple homogeneous ignition and uniform combustion of the engine, greatly improve the combustion efficiency, and meet higher energy-saving emission standards.

It should be noted that the first movement electrode structure may be a composite structure composed of a plurality of discharge electrodes, and the first combination shape refers to a shape of the composite structure composed of the plurality of discharge electrodes of the first movement electrode structure, which will be described in detail later with reference to the drawings. The words "movement" and "fixed" described in the movement electrode 1 and the fixed electrode 3 do not constitute a limitation to the embodiments of the present disclosure. In some engines, it is possible that the fixed electrode 3 can move and the movement electrode 1 is fixed. The term "distributed multi-cavity structure" described in the distributed multi-cavity combustion chamber 2 does not constitute a limitation to the embodiments of the present disclosure. The term "variable interval discharge" described in the variable interval discharge region 4 does not constitute a limitation to the embodiments of the present disclosure, and the change of the interval of the variable interval discharge region 4 is relative to the movement time in the case where the engine is in operation.

For example, the movement electrode includes at least one first discharge electrode. The at least one first discharge electrode is arranged at the top portion of the piston and includes the first combination shape and the first movement electrode structure, and the at least one first discharge electrode is integrated with the piston. The least one first discharge electrode is configured to reciprocate with the piston, and the piston may be connected with a crank connection rod of the engine, and the piston is connected with a common ground through the crank connection rod of the engine. As illustrated in FIG. 1A, FIG. 1B, and FIG. 1C, the movement electrode 1 includes a plurality of first discharge electrodes. The plurality of first discharge electrodes are arranged at the top portion 131 of the piston and include a first combination shape and a first movement electrode structure, respectively, and the plurality of first discharge electrodes are integrated with the piston 13. Upper surfaces of the first discharge electrodes include a part of the top surface 132 of the piston of the piston. The plurality of first discharge electrodes may reciprocate with the piston 13, the piston 13 may be connected with the crank connection rod of the engine, and the piston 13 is connected with the common ground through the crank connection rod of the engine. That is, the movement electrode 1 is grounded.

For example, a diameter of the piston 13 ranges from 110 mm to 130 mm, for example, is 120 mm.

Figure 2:
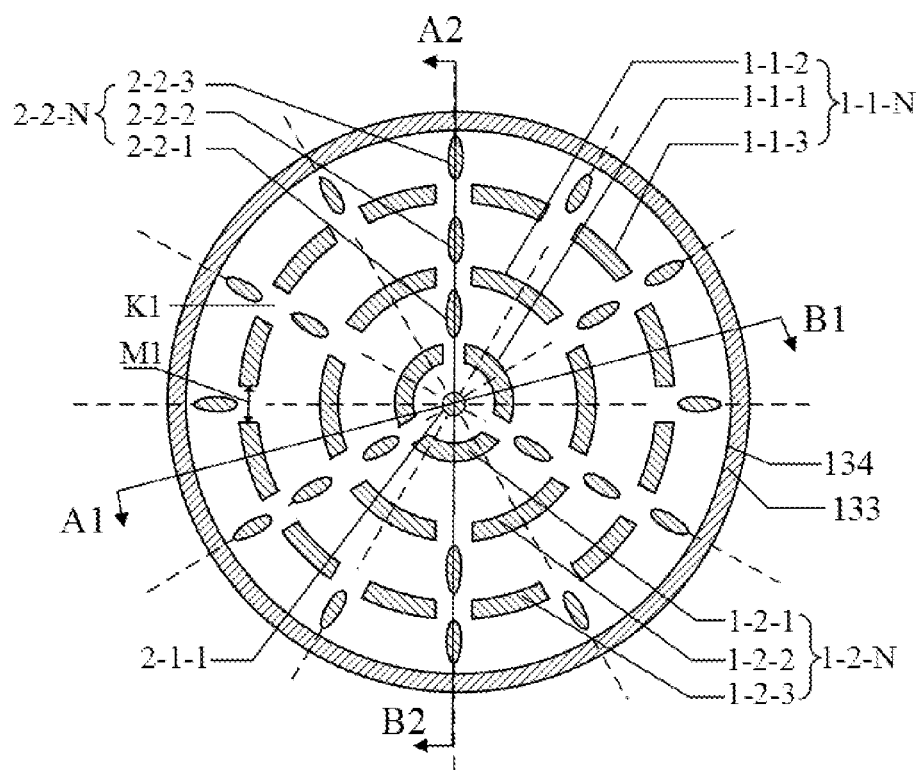
FIG. 2 is a schematic diagram of a movement electrode provided by at least one embodiment of the present disclosure.

For example, FIG. 2 is a schematic diagram of a movement electrode provided by at least one embodiment of the present disclosure. As illustrated in FIG. 2, the movement electrode 1 includes at least one group of open discharge rings 1-1-N, the at least one group of open discharge rings 1-1-N is concentric with a geometric center of the top portion 131 of the piston and a geometric center of the top surface 132 of the piston of the piston. The top surface 132 of the piston is an end surface of the top portion 131 of the piston facing the fixed electrode 2. The term "open" in "at least one group of open discharge rings" indicates that the plane shape of a group of open discharge rings is discontinuous at a circumference, as shown in FIG. 2.

For example, as illustrated in FIG. 2, the at least one group of open discharge rings 1-1-N includes a first innermost discharge ring 1-1-1, a first outermost discharge ring 1-1-3, and at least one first intermediate discharge ring 1-1-2 located between the first innermost discharge ring 1-1-1 and the first outermost discharge ring 1-1-3. For example, a case that a total number of at least one first intermediate discharge ring 1-1-2 is one is taken as an example (in FIG. 2), that is, the at least one group of open discharge rings 1-1-N includes three discharge rings. The first innermost discharge ring 1-1-1, the first outermost discharge ring 1-1-3 and the first intermediate discharge ring 1-1-2 are concentric circular rings. A nested structure of the at least one group of open discharge rings 1-1-N of the movement electrode 1 is beneficial to the uniformity of gas ionization in the engine.

For example, in other embodiments, the total number of the first intermediate layer discharge rings 1-1-2 can also be two, three, etc., and the total number of the discharge rings of the at least one group of open discharge rings 1-1-N may be designed according to the size of the piston of the engine, which is not limited by the embodiments of the present disclosure.

Figure 3A:
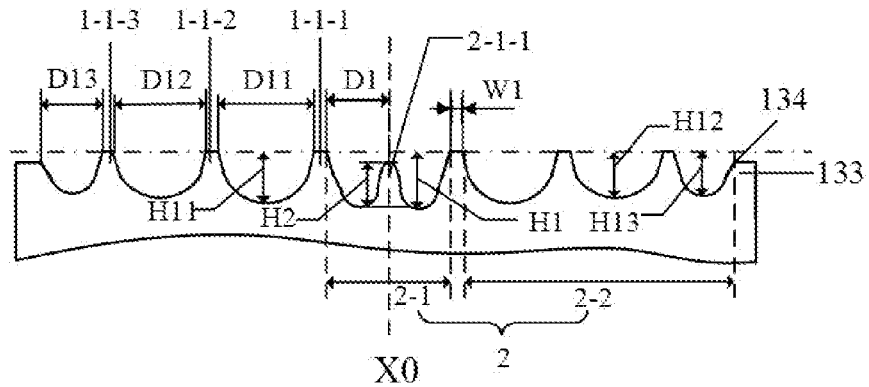
FIG. 3A is a schematic cross-sectional view of a movement electrode provided by at least one embodiment of the present disclosure taken along the line A1-B1 in FIG. 2.
Figure 3B:
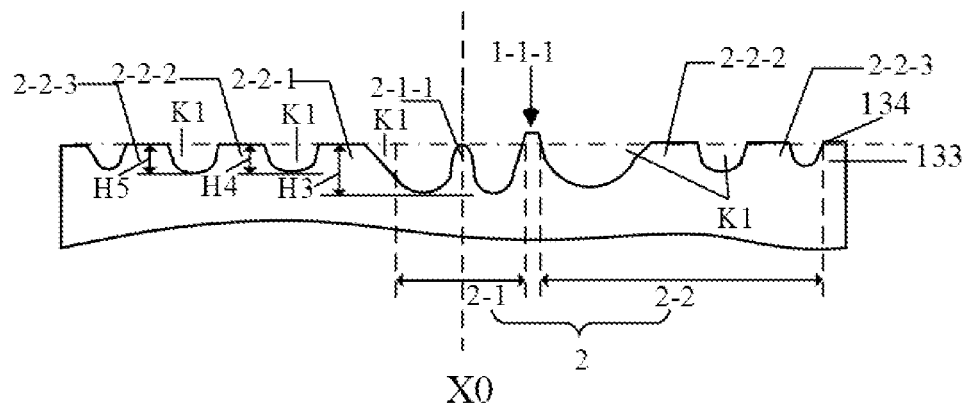
FIG. 3B is a schematic cross-sectional view of a movement electrode provided by at least one embodiment of the present disclosure taken along the line A2-B2 in FIG. 2.

For example, FIG. 3A is a schematic cross-sectional view of a movement electrode provided by at least one embodiment of the present disclosure taken along the line A1-B1 in FIG. 2; FIG. 3B is a schematic cross-sectional view of a movement electrode provided by at least one embodiment of the present disclosure taken along the line A2-B2 in FIG. 2. As illustrated in FIG. 3A and FIG. 3B, the first innermost discharge ring 1-1-1 has a first height (for example, the first innermost discharge ring 1-1-1 protrudes toward the fixed electrode 2 relative to an inner edge 134 of a top land 133 of the piston), and a cross section of the first innermost discharge ring 1-1-1 in a radial direction of the first innermost discharge ring 1-1-1 is in a trapezoidal shape with an upper end and a lower end that is wider than the upper end. The top land 133 of the piston refers to a side edge of the piston. The inner edge refers to the edge close to the geometric center X0 of the top surface of the piston. A bottom surface of the trapezoidal shape is located in a same plane as a top surface of the top land 133. Similarly, cross-sectional shapes of the first intermediate discharge ring 1-1-2 and the first outermost discharge ring 1-1-3 along the radial direction of the at least one group of open discharge rings 1-1-N are the same as the cross-sectional shape of the first innermost ring 1-1-1 along the radial direction of the at least one group of open discharge rings 1-1-N. The at least one group of open discharge rings 1-1-N includes a plurality of discharge surfaces 1-2-N. A upper surface of the first innermost discharge ring 1-1-1 is a discharge surface 1-2-1, that is, the end surface of the first innermost discharge ring 1-1-1 close to the fixed electrode 2 is the discharge surface 1-2-1. The discharge surface of the first innermost discharge ring 1-1-1 faces the fixed electrode 2. The discharge surface of the first innermost discharge ring 1-1-1 also serves as the top surface 132 of the piston. For example, the at least one group of open discharge rings 1-1-N are integrally formed with the piston 13, for example, a part of the top surface 132 of the piston is the discharge surface 1-2-N. Similarly, upper surfaces of the first intermediate layer discharge ring 1-1-2 and the first outermost discharge ring 1-1-3 are respectively a discharge surface 1-2-2 and a discharge surface 1-2-3. The plurality of discharge surfaces 1-2-N of the at least one group of open discharge rings 1-1-N are equal in height and parallel to each other. The width W1 of each open discharge ring of the at least one group of open discharge rings 1-1-N in the radial direction of the at least one group of open discharge rings 1-1-N ranges from 0.5 mm to 5 mm, for example, the value of width W1 is 1.5 mm. The width of the bottom surface of the cross section of the first innermost discharge ring 1-1-1 in the radial direction of the first innermost discharge ring 1-1-1 is, for example, 3 mm. It should be noted that the width here refers to the width of each of the plurality of discharge surfaces 1-2-N of the at least one group of open discharge rings 1-1-N along the radial direction of the at least one group of open discharge rings 1-1-N.

For example, in other embodiments, the total number of the first intermediate discharge rings 1-1-2 may also be two, three, four, etc., and the embodiments of the present disclosure are not limited thereto. The cross-sectional shapes of the first intermediate discharge ring 1-1-2 and the first outermost discharge ring 1-1-3 taken along the radial direction of the at least one group of open discharge rings 1-1-N and the cross-sectional shape of the first innermost discharge ring 1-1-1 along the radial direction of the first innermost ring 1-1-1 may also be different from each other. For example, the side edges of cross sections of the first intermediate layer discharge ring 1-1-2 and the first group outermost layer ring 1-1-3 taken along the radial direction of the at least one group of open discharge rings 1-1-N are in an arc shape. The plurality of discharge surfaces 1-2-N of the at least one group of open discharge rings 1-1-N may also be arranged to be unequal in height. For example, in a direction from the center X0 of the piston 13 to an edge of the piston 13, the heights of the first innermost discharge ring 1-1-1, the first intermediate discharge ring 1-1-2, and the first outermost discharge ring 1-1-3 gradually increase or gradually decrease.

For example, as illustrated in FIG. 2 and FIG. 3A, a distance D1 between the inner side of the first innermost discharge ring 1-1-1 and the geometric center X0 of the top surface of the piston ranges from 1 mm to 9.5 mm, for example, the value of the distance D1 is 9 mm. The inner side indicates the side close to the geometric center X0 of the top surface of the piston. A distance D11 between the outer side of the first innermost ring 1-1-1 and the inner side of the first intermediate discharge ring 1-1-2 immediately adjacent to the first innermost discharge ring 1-1-1 is two times as large as the distance D1 between the inner side of the first innermost discharge ring 1-1-1 and the geometric center X0 of the top surface 132 of the piston, for example, the value of the distance D11 is 18 mm. The outer side indicates the side away from the geometric center X0 of the top surface of the piston. A distance D12 between two sides, facing each other (for example, the outer side of the first intermediate discharge ring 1-1-2 and the inner side of the first outermost discharge ring 1-1-3), of two adjacent discharge rings of the at least one group of open discharge rings 1-1-N is also two times as large as the distance D1 between the inner side of the first innermost discharge ring 1-1-1 and the geometric center X0 of the piston top surface, for example, the value of the distance D12 is 18 mm. A distance D13 between an outer side of the first outermost discharge ring 1-1-3 and the inner edge 134 of the piston top land 133 is equal to (for example, approximately equal to) the distance D1 between the inner side of the first innermost discharge ring 1-1-1 and the geometric center X0 of the top surface of the piston, for example, the value of the distance D13 is 9 mm.

For example, the width of the top land 133 of the piston ranges from 2 mm to 3 mm, for example, the value of the width of the top land 133 of the piston is 2.5 mm.

For example, as illustrated in FIG. 2 and FIG. 3B, the movement electrode 1 further includes a plurality of notches K1. The plurality of notches K1 are distributed on the at least one group of open discharge rings 1-1-N in a manner of equally dividing a circumference (i.e., being evenly spaced along the circumference of the ring). The width M1 of each notch K1 ranges from 2 mm to 10 mm (for example, the width of the notch K1 along a circumferential direction of the at least one group of open discharge rings 1-1-N), for example, the value of the width M1 is 6 mm. At least one notch K1 is arranged on each discharge ring of the at least one group of open discharge rings 1-1-N. For example, as illustrated in FIG. 2, a plurality of notches K1 are arranged, and a total number of notches K1 increases from the first innermost discharge ring 1-1-1 to other discharge rings in order. That is, the number of notches K1 arranged on the first innermost discharge ring 1-1-1, the number of notches K1 arranged on the first intermediate discharge ring 1-1-2, and the number of notches K1 arranged on the first outermost discharge ring 1-1-3 are gradually increased. The notch(es) K1 arranged on the first innermost discharge ring 1-1-1 is/are aligned in the radial direction of the first innermost discharge ring 1-1-1 on each discharge ring of the at least one group of open discharge rings 1-1-N. That is, the notch(es) K1 arranged on the first innermost discharge ring 1-1-1 is/are correspondingly arranged on the first outermost discharge ring 1-1-3 and the first intermediate discharge ring 1-1-2. For example, the first innermost discharge ring 1-1-1 is arranged with three notches K1 in a manner of equally dividing a circumference, and an included angle of the three notches K1 is 60 degrees. At positions corresponding to the three notches K1 of the first innermost discharge ring 1-1-1 along the radial direction of the first innermost discharge ring 1-1-1, three notches K1 are arranged on the first intermediate discharge ring 1-1-2 and three notches K1 are also arranged the first group of outermost rings 1-1-3. The first intermediate discharge ring 1-1-2 immediately adjacent to the first innermost discharge ring 1-1-1 is further arranged with three notches K1 staggered from the three notches K1 on the first innermost discharge ring 1-1-1. The number of notches K1 further arranged on the first intermediate discharge ring 1-1-2 is the same as the number of notches K1 on the first innermost discharge ring 1-1-1, for example, the number is three. That is, the number of notches K1 on the first intermediate discharge ring 1-1-2 is two times as large as the number of notches K1 on the first innermost discharge ring 1-1-1. The six notches K1 arranged on the first intermediate discharge ring 1-1-2 are distributed in a manner of equally dividing a circumference, and an included angle between two adjacent notches K1 is 30 degrees. The first outermost discharge ring 1-1-3 is further arranged with a plurality of notches K1 staggered from the notches K1 provided on the first intermediate discharge ring 1-1-2 immediately adjacent to the first outermost discharge ring 1-1-3. The number of notches K1 further provided on the first outermost discharge ring 1-1-3 is the same as the number of notches K1 on the first intermediate discharge ring 1-1-2, for example, the number is six. That is, the number of notches K1 on the first outermost discharge ring 1-1-3 is two times as large as the number of notches K1 on the first intermediate discharge ring 1-1-2. The twelve notches K1 arranged on the first outermost discharge ring 1-1-3 are distributed in a manner of equally dividing a circumference, and an included angle between two adjacent notches K1 is 15 degrees. According to the above rule, the notches K1 are arranged on each discharge ring of the at least one group of open discharge rings 1-1-N. The notches K1 divide each discharge ring of the at least one group of open discharge rings 1-1-N into multi-segment structures, which is beneficial to the uniformity of gas ionization, and further contributes to the realization of multiple homogeneous ignition and uniform combustion of the engine.

For example, in other embodiments, the number of notches K1 arranged on the first innermost discharge ring 1-1-1 may be four. Accordingly, the number of notches K1 arranged on the first intermediate discharge ring 1-1-2 may be six, and the number of notches K1 provided on the first outermost layer discharge ring 1-1-3 may be sixteen.

For example, as illustrated in FIG. 3A and FIG. 3B, the distributed multi-cavity combustion chamber 2 includes a downwards concave region at the inner side of the first outermost discharge ring 1-1-1, between two adjacent discharge rings of the at least one group of open discharge rings 1-1-N (for example, between the outer side of the first innermost discharge ring 1-1-1 and the inner side of the first intermediate discharge ring 1-1-2, between the outer side of the first intermediate discharge ring 1-1-2 and the inner side of the first outermost discharge ring 1-1-3), and at the outer side of the first outermost discharge ring 1-1-3 (for example, between the outer side of the first outermost discharge ring 1-1-3 and the inner edge 134 of the piston top land). The distributed multi-cavity combustion chamber 2 includes a combustion chamber main cavity 2-1 and a combustion chamber auxiliary cavity 2-2.

For example, as illustrated in FIG. 3A and FIG. 3B, the combustion chamber main cavity 2-1 includes a downwards concave region with flat ω-shape at the inner side the first outermost discharge ring 1-1-1, and a diameter of the downwards concave region of the combustion chamber main cavity 2-1 is two times as large as the distance between the inner side of the first innermost discharge ring 1-1-1 and the geometric center X0 of the top surface of the piston. The maximum depth H1 (as illustrated in FIG. 3A) of the combustion chamber main cavity ranges from 0.5 mm to 5 mm, for example, the value of the maximum depth H1 is 2.3 mm. The combustion chamber auxiliary cavity 2-2 includes a downwards concave region between two adjacent discharge rings of the at least one group of open discharge rings 1-1-N (for example, between the outer side of the first innermost discharge ring 1-1-1 and the inner side of the first intermediate discharge ring 1-1-2, between the outer side of the first intermediate discharge ring 1-1-2 and the inner side of the first outermost discharge ring 1-1-3) and at the outer side of the first outermost discharge ring (for example, between the outer side of the first outermost discharge ring 1-1-3 and the inner edge 134 of top land of the piston). A concave depth of the combustion chamber auxiliary cavity 2-2 gradually increases from the top land 134 of the piston to the geometric center X0 of the top surface of the piston. For example, the depth H11 between the outer side of the first innermost discharge ring 1-1-1 and the inner side of the first intermediate discharge ring 1-1-2 is greater than the depth H12 between the outer side of the first intermediate discharge ring 1-1-2 and the inner side of the first outermost discharge ring 1-1-3, and the depth H12 is greater than the depth H13 between the outer side of the first outermost discharge ring 1-1-3 and the inner edge 134 of the piston top land. The concave depth (for example, the depth H11, the depth H12, or the depth H13) of the combustion chamber auxiliary cavity 2-2 is 30%-70% of the maximum depth of the combustion chamber main cavity.

For example, the depth H11 between the outer side of the first innermost discharge ring 1-1-1 and the inner side of the first intermediate discharge ring 1-1-2 ranges from 2.0 mm to 2.2 mm, for example, the value of the depth H11 is 2.1 mm. For example, the depth H12 between the outer side of the first intermediate layer discharge ring 1-1-2 and the inner side of the first outermost layer discharge ring 1-1-3 ranges from 1.8 mm to 2.0 mm, for example, the value of the depth H12 is 1.9 mm. For example, the depth H13 between the outer side of the first outermost discharge ring 1-1-3 and the inner edge 134 of the top land of the piston ranges from 1.6 mm to 1.8 mm, for example, the value of the depth H13 is 1.7 mm.

For example, as illustrated in FIG. 2 and FIG. 3A, the piston discharge structure further includes a squeeze flow guide protrusion 2-1-1. The extrusion flow guiding boss 2-1-1 is arranged at a concave downwards center of the combustion chamber main cavity 2-1, and the concave downwards center coincides with the geometric center X0 of the top surface of the piston. A cross section of the extrusion flow guide protrusion 2-1-1 taken along a longitudinal direction is "bell-shaped". It should be noted that "bell-shaped" means that an upper half of the profile shape of the cross section of the extrusion flow guide protrusion 2-1-1 taken along the longitudinal direction is similar to a parabola. The area of a bottom surface of the extrusion flow guide protrusion 2-1-1 is 20%-50% of the area of a bottom surface of the combustion chamber main cavity. For example, the value of the width of the bottom surface of the extrusion flow guide protrusion 2-1-1 is 5.4 m, and the height H2 of the extrusion flow guide protrusion 2-1-1 is 50%-70% of the maximum depth H1 of the combustion chamber main cavity, for example, the value of the height H2 is 1.3 mm.

It should be noted that the "extrusion flow guide" described in the extrusion flow guide protrusion 2-1-1 does not constitute a limitation on the embodiments of the disclosure, but is only a name used to distinguish different technical features.

For example, as illustrated in FIG. 2 and FIG. 3B, the piston discharge structure further includes a plurality of groups of extrusion flow guide protrude ridges 2-2-N. The plurality of groups of extrusion flow guide protrude ridges 2-2-N are arranged at the crossing positions between the combustion chamber auxiliary chamber main cavity 2-2 and the plurality of notches K1 of the movement electrode 1, and the extrusion flow guide protrude ridges 2-2-N are located at centers of the crossing positions. For example, the plurality of groups of extrusion flow guide protrude ridges 2-2-N include a first group of extrusion flow guide protrude ridges 2-2-1, a second group of extrusion flow guide protrude ridges 2-2-2, and a third group of extrusion flow guide protrude ridges 2-2-3. The number of the first group of extrusion flow guide protrude ridges 2-2-1, the number of the second group of extrusion flow guide protrude ridges 2-2-2, and the number of the third group of extrusion flow guide protrude ridges 2-2-3 are the same as the number of the notches K1 on the first innermost discharge ring 1-1-1, the number of the notches K1 on the first intermediate discharge ring 1-1-2, and the number of the notches K1 on the first outermost discharge ring 1-1-3, respectively, that is, the number of the first group of extrusion flow guide protrude ridges 2-2-1 is three, the number of the second group of extrusion flow guide protrude ridges 2-2-2 is six, and the number of the third group of extrusion flow guide protrude ridges 2-2-3 is twelve. The length of each extrusion flow guide protrude ridge of the first group of extrusion flow guide protrude ridges 2-2-1, the length of each extrusion flow guide protrude ridge of the second group of extrusion flow guide protrude ridges 2-2-2, and the length of each extrusion flow guide protrude ridge of the third group of extrusion flow guide protrude ridges 2-2-3 along the radial direction of the at least one group of open discharge rings 1-1-N are equal (for example, substantially equal). The width of each extrusion flow guide protrude ridge of the first group of extrusion flow guide protrude ridges 2-2-1, the width of each extrusion flow guide protrude ridge of the second group of extrusion flow guide protrude ridges 2-2-2, and the width of each extrusion flow guide protrude ridge of the third group of extrusion flow guide protrude ridges 2-2-3 along the circumferential direction of the at least one group of open discharge rings 1-1-N are equal (for example, substantially equal). Therefore, the plasma flow is more uniform in the fluid among the first innermost discharge ring 1-1-1, the first intermediate discharge ring 1-1-2, and the first outermost discharge ring 1-1-3.

For example, the first group of extrusion flow guide protrude ridges, the second group of extrusion flow guide protrude ridges, and the third group of extrusion flow guide protrude ridges are not equal or equal in height. As illustrated in FIG. 3B, the ridge height of the extrusion flow guide protrude ridges 2-2-N is 30%-70% of the maximum depth H1 of the combustion chamber main cavity. For example, the ridge height H3 of the first group of extrusion flow guide protrude ridges 2-2-1 is a distance between an upper surface of the first group of extrusion flow guide protrude ridges 2-2-1 (i.e., the surface of the first group of extrusion flow guide protrude ridges 2-2-1 close to the fixed electrode 3) and a lowest point at the inner side of the first innermost discharge ring 1-1-1. For example, the value of ridge height H3 is 1.25 mm. For example, the ridge height H4 of the second group of extrusion flow guide protrude ridges 2-2-2 is a distance between an upper surface of the second group of extrusion flow guide protrude ridges 2-2-2 (i.e., the surface of the second group of extrusion flow guide protrude ridges 2-2-2 close to the fixed electrode 3) and a lowest point in a region between the outer side of the first innermost discharge ring 1-1-1 and the inner side of the first intermediate discharge ring 1-1-2, for example, the value of ridge height H4 is 1.15 mm. For example, the ridge height H5 of the third group of extrusion flow guide protrude ridges 2-2-3 is a distance between an upper surface of the third group of extrusion flow guide protrude ridges 2-2-3 (i.e., the surface of the third group of extrusion flow guide protrude ridges 2-2-3 close to the fixed electrode 3) and a lowest point in a region between the outer side of the first intermediate layer discharge ring 1-1-2 and the inner side of the first outermost layer discharge ring 1-1-3, for example, the value of ridge height H5 is 1.12 mm. For example, the upper surfaces of the first group of extrusion flow guide protrude ridges 2-2-1, the upper surfaces of the second group of extrusion flow guide protrude ridges 2-2-2, and the upper surfaces of the third group of extrusion flow guide protrude ridges 2-2-3 are located on the same horizontal plane. For example, the extrusion flow guide protrude ridge 2-2-N has a "bell-shaped" cross section. Both sides of the extrusion flow guide protrude ridge 2-2-N in the length direction are symmetrically or symmetrically provided with guide slopes, and both sides of the extrusion flow guide protrude ridge 2-2-N in the width direction are symmetrically or asymmetrically provided with guide slopes. Therefore, the plasma flow among the first innermost discharge ring 1-1-1, the first intermediate discharge ring 1-1-2, and the first outermost discharge ring 1-1-3 is more uniform, which is beneficial to the uniformity of gas ionization and the realization of multiple homogeneous ignition and uniform combustion of the engine.

For example, as illustrated in FIG. 2 and FIG. 3A, the combustion chamber combustion chamber main cavity 2-1 and the combustion chamber auxiliary chamber main cavity 2-2 constitute a complex shape of labyrinth, so that the gas in the engine can be ionized more fully and the combustion can be more uniform.

It should be noted that the "extrusion flow guide" described in the plurality of groups of extrusion flow diversion ridges 2-2-N does not constitute a limitation on the embodiments of the present disclosure, and in the embodiments of the present disclosure, "extrusion flow guide" is used to distinguish the names of other technical features.

For example, in other embodiments, the number of the first group of extrusion flow guide protrude ridges 2-2-1 may be four. Accordingly, the number of the second group of extrusion flow guide protrude ridges 2-2-2 may be six, and the number of the third group of extrusion flow guide protrude ridges 2-2-3 may be sixteen.

For example, in other embodiments, the upper surfaces of the first group of extrusion flow guide protrude ridges 2-2-1, the upper surfaces of the second group of extrusion flow guide protrude ridges 2-2-2, and the upper surfaces of the third group of extrusion flow guide protrude ridges 2-2-3 may not be located in the same horizontal plane. For example, in a direction from the center of the piston 13 to the edge of the piston 13, the upper surfaces of the first group of extrusion flow guide protrude ridges 2-2-1, the upper surfaces of the second group of extrusion flow guide protrude ridges 2-2-2, and the upper surfaces of the third set of extrusion flow guide protrude ridges 2-2-3 are mutually staggered.

For example, in other embodiments, the piston discharge structure may not include the third group of extrusion flow guide protrude ridges 2-2-3, i.e., only the first group of extrusion flow guide protrude ridges 2-2-1 and the second group of extrusion flow guide protrude ridges 2-2-2 are arranged, and the embodiments of the present disclosure are not limited thereto.

For example, the fixed electrode includes at least one second discharge electrode fixed which is on the top portion of the cylinder block or the bottom portion of the cylinder head and includes a second combination shape and a second structure. As illustrated in FIG. 1A, FIG. 1B and FIG. 1C, the fixed electrode 3 includes a plurality of second discharge electrodes that are fixed to the top portion 222 of the cylinder block or the bottom portion 122 of the cylinder head and include a second combination shape and a second structure. The plurality of second discharge electrodes are located directly above the movement electrode 1, and end surfaces of the plurality of the second discharge electrodes facing the discharge surface of the movement electrode 1 is arranged as discharge surfaces. In the case where the movement electrode 1 is located at the position at top dead center (TDC), fixed gaps between the plurality of second discharge electrodes and the movement electrode 1 in a direction perpendicular to the fixed electrode 3, and the plurality of second discharge electrodes are connected with an external power supply to form a voltage difference between the fixed electrode 3 and the movement electrode 1.

It should be noted that the second structure may include a composite structure composed of a plurality of second discharge electrodes, and the second combination shape refers to the shape of the composite structure composed of the plurality of second discharge electrodes of the second structure, which will be described in detail later with reference to the drawings. The TDC position refers to a position where the piston 13 is closest to the cylinder head 121 in the process of reciprocating up and down during the engine operation.

Figure 4:
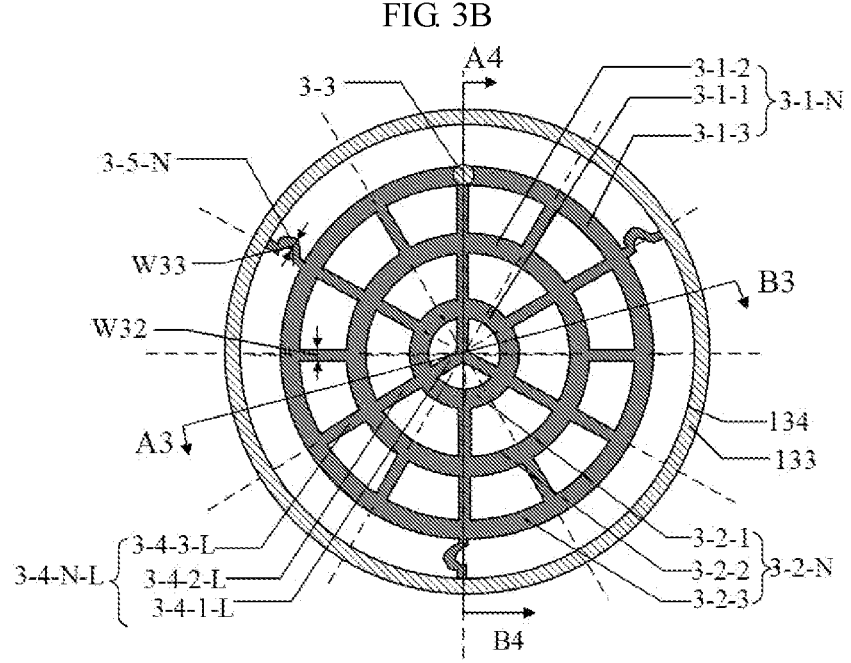
FIG. 4 is a schematic diagram of a fixed electrode provided by at least one embodiment of the present disclosure.

For example, FIG. 4 is a schematic diagram of a fixed electrode provided by at least one embodiment of the present disclosure. As illustrated in FIG. 4, the fixed electrode 3 includes one group of closed-circle discharge rings 3-1-N, the one group of closed-circle discharge rings 3-1-N have the same geometric center and similar shape and profile as the group of open discharge rings 1-1-N of the movement electrode 1. The one group of closed-circle discharge rings 3-1-N includes a second innermost discharge ring 3-1-1, a second outermost discharge ring 3-1-3, and at least one second intermediate discharge ring 3-1-2 located between the second innermost discharge ring 3-1-1 and the second outermost discharge ring 3-1-3. For example, the case that the number of at least one second intermediate discharge ring 3-1-2 is one is taken as an example (in FIG. 4), that is, the one group of closed-circle discharge rings 3-1-N includes three discharge rings. The second innermost discharge ring 3-1-1, the second outermost discharge ring 3-1-3, and the second intermediate discharge ring 3-1-2 are concentric circular rings. The multi-ring nested structure of the one group of closed-circle discharge rings 3-1-N of the fixed electrode 3 is beneficial to the uniformity of gas ionization in the engine, which is conducive to the realization of multiple homogeneous ignition and uniform combustion of the engine.

For example, in other embodiments, the number of second intermediate discharge rings 3-1-2 may also be two, three, etc., and the embodiments of the present disclosure are not limited thereto.

Figure 5A:
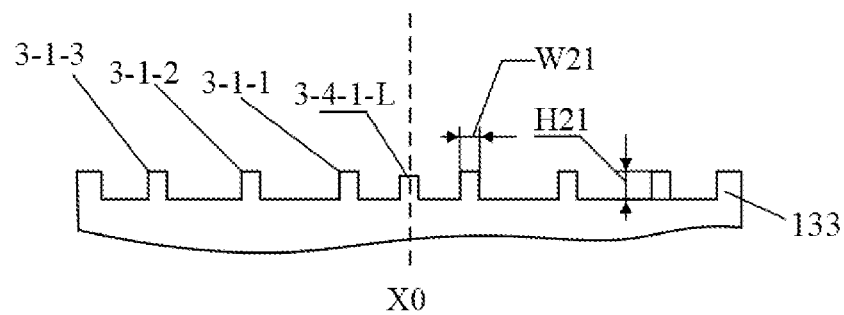
FIG. 5A is a schematic cross-sectional view of a fixed electrode provided by at least one embodiment of the present disclosure taken along the line A3-B3 in FIG. 4.
Figure 5B:
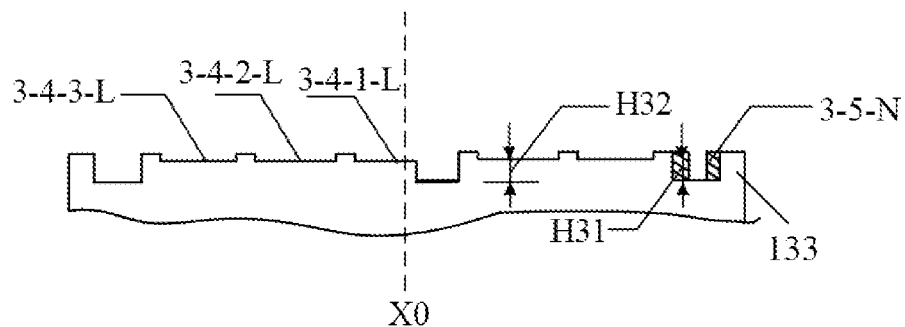
FIG. 5B is a schematic cross-sectional view of the fixed electrode provided by at least one embodiment of the present disclosure taken along the line A4-B4 in FIG. 4.

For example, FIG. 5A is a schematic cross-sectional view of a fixed electrode provided by at least one embodiment of the present disclosure taken along the line A3-B3 in FIG. 4; FIG. 5B is a schematic cross-sectional view of the fixed electrode provided by at least one embodiment of the present disclosure taken along the line A4-B4 in FIG. 4. As illustrated in FIG. 5A and FIG. 5B, the cross section of the second innermost discharge ring 3-1-1 along a radial direction of the second innermost discharge ring 3-1-1 is in a rectangular shaped, and the thickness H21 of the second innermost discharge ring 3-1-1 (as illustrated in FIG. 5A) (i.e., along the radial direction of the second innermost discharge ring 3-1-1) ranges from 1 mm to 8 mm, for example, the value of thickness H21 is 4 mm. Similarly, a cross-sectional shape of the second intermediate discharge ring 3-1-2 and a cross-sectional shape of the second outermost discharge ring 3-1-3 along the radial direction of the one group of closed-circle discharge rings 3-1-N are the same as the cross-sectional shape of the second innermost discharge ring 3-1-1 along the radial direction of the one group of closed-circle discharge rings 3-1-N. The one group of closed-circle discharge rings 3-1-N includes a plurality of discharge surfaces 3-2-N. An end surface of the second innermost discharge ring 3-1-1 facing the discharge surface 1-2-1 of the first innermost discharge ring 1-1-1 includes as a discharge surface 3-2-1. Similarly, an end surface of the second intermediate layer discharge ring 3-1-2 and an end surface of the second outermost layer discharge ring 3-1-3 respectively include a discharge surface 3-2-2 and a discharge surface 3-2-3. The plurality of discharge surfaces 3-2-N of the one group of closed-circle discharge rings 3-1-N are equal in height (for example, substantially equal) and parallel to each other. The width W21 of the second innermost discharge ring 3-1-1 (as illustrated in FIG. 5A) (that is, the width of the discharge surface 3-2-1 of the second innermost discharge ring 3-1-1) ranges from 0.2 mm to 4 mm, for example, the value of width W21 is 2 mm.

For example, in other embodiments, the number of the second intermediate discharge rings 3-1-2 may be two, three, four, etc., and the embodiments of the present disclosure are not limited thereto. The cross-sectional shape of the second intermediate discharge ring 3-1-2 and the cross-sectional shape of the second outermost discharge ring 3-1-3 along the radial direction of the one group of closed-circle discharge rings 3-1-N may be different from the cross-sectional shape of the second innermost discharge ring 3-1-1 along the radial direction of the second innermost ring 3-1-1. For example, side edges of cross sections of the second intermediate layer discharge ring 3-1-2 and the second outermost layer discharge ring 3-1-3 along the radial direction of the one group of closed-circle discharge rings 3-1-N are in an arc shape. The plurality of discharge surfaces 3-2-N of the one group of closed-circle discharge rings 3-1-N may be unequal in height. For example, the height of the second innermost discharge ring 3-1-1, the height of the second intermediate discharge ring 3-1-2, and the height of the second outermost discharge ring 3-1-3 gradually increase or gradually decrease in the direction from the center of the piston 13 to the top land 133 of the piston 13.

For example, as illustrated in FIG. 2 and FIG. 4, the one group of closed-circle discharge rings 3-1-N and the at least one group of open discharge rings 1-1-N have the same number of discharge rings, and are opposite to each other (i.e., an axis of the closed-circle discharge rings 3-1-N coincide with an axis the open discharge rings 1-1-N), so that the discharge surfaces of the one group of closed-circle discharge rings 3-1-N and the discharge surfaces the at least one group of open discharge rings 1-1-N face each other, thereby improving the gas ionization capability of the engine in the working process.

Figure 6:
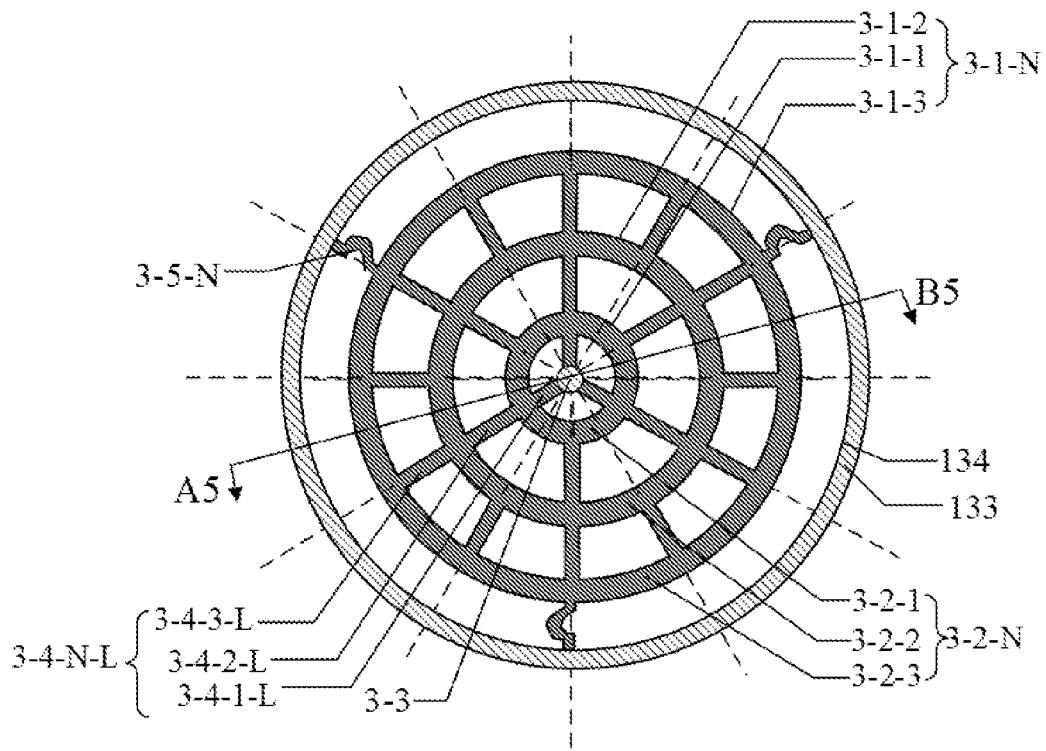
FIG. 6 is a schematic diagram of another fixed electrode provided by at least one embodiment of the present disclosure.

For example, FIG. 6 is a schematic diagram of another fixed electrode provided by at least one embodiment of the present disclosure. As illustrated in FIG. 4 and FIG. 6, the piston discharge structure further includes at least one cylindrical feed connection port 3-3, a plurality of groups of linear radially connected inductors 3-4-N-L, and a plurality of curved fixed support inductors 3-5-N. For example, the number of the at least one cylindrical feed connection port 3-3 is one, the one cylindrical feed connection port 3-3 is configured to connect with a feed lead-in terminal 17 (as illustrated in FIG. 1A, FIG. 1B, and FIG. 1C) so as to connect the external power supply.

Figure 7:
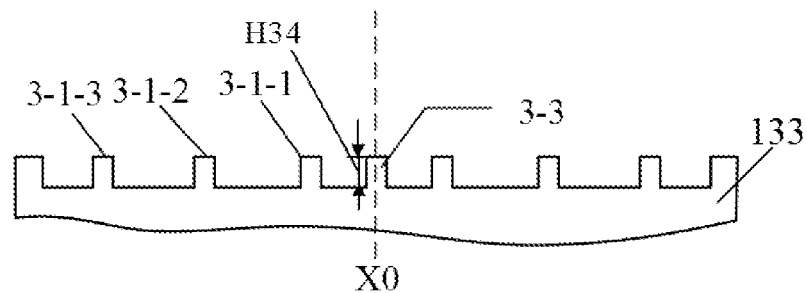
FIG. 7 is a schematic cross-sectional view of a fixed electrode provided by at least one embodiment of the present disclosure taken along the line A5-B5 in FIG. 6.

For example, FIG. 7 is a schematic cross-sectional view of the fixed electrode provided by at least one embodiment of the present disclosure taken along the line A5-B5 in FIG. 6. As illustrated in FIG. 6 and FIG. 7, in the case that the cylindrical feed connection port 3-3 is arranged at the center of the movement electrode 1, that is, the center of the fixed electrode 2, the cylindrical feed connection port 3-3 includes a cylinder with a threaded or a bayonet base or a plug-in interface, and both the thickness H34 (as illustrated in FIG. 7) and the diameter of the cylindrical feed connection port 3-3 range from 3 mm to 10 mm. For example, the thickness of the cylindrical feed connection port 3-3 is 4 mm, and the diameter of the cylindrical feed connection port 3-3 is 5 mm.

For example, as illustrated in FIG. 5B, the plurality of groups of linear radially connected inductors 3-4-N-L include a first group of linear radially connected inductors 3-4-1-L, a second group of linear radially connected inductors 3-4-2-L, and a third group of linear radially connected inductors 3-4-3-L. The thickness of each linear radially connected inductor of the plurality of groups of linear radially connected inductors 3-4-N-L is 60%-85% of the thickness W21 of the second innermost discharge ring 3-1-N, for example, the value of thickness of each linear radially connected inductor of the plurality of groups of linear radially connected inductors 3-4-N-L is 3.5 mm. The width W32 of each linear radially connected inductor of the plurality of groups of linear radially connected inductors 3-4-N-L ranges from 1 mm to 9 mm, for example, the value of width W32 is 2 mm.

For example, as illustrated in FIG. 6, the plurality of groups of linear radially connected inductors 3-4-N-L include a first group of linear radially connected inductors 3-4-1-L located at the inner side the second innermost discharge ring 3-1-1 (in the case that the cylindrical feed connection port 3-3 is arranged at the center of the fixed electrode 3, as illustrated in FIG. 6, the first group of linear radially connected inductors 3-4-1-L communicate with the cylindrical feed connection port 3-3 and the second innermost discharge ring 3-1-1), a second group of linear radially connected inductors 3-4-2-L communicated with the second innermost discharge ring 3-1-1 and the second intermediate discharge ring 3-1-2, and a third group of linear radially connected inductors 3-4-3-L communicated with the second intermediate discharge ring 3-1-2 and the second outermost discharge ring 3-1-3. The number of linear radially connected inductors of each group of the plurality of groups of linear radially connected inductors 3-4-N-L is different, for example, the number of the linear radially connected inductors of the first group of linear radially connected inductors 3-4-1-L, the number of the linear radially connected inductors of the second group of linear radially connected inductors 3-4-2-L, and the number of the linear radially connected inductors of the third group of linear radially connected inductors 3-4-3-L are different from each other. The plurality of groups of linear radially connected inductors 3-4-N-L are doubled group by group along the direction from the top land 133 of the piston toward the geometric center of the top surface 132 of the piston. That is, the number of linear radially connected inductors of the third group of linear radially connected inductors 3-4-3-L is two times as large as the number of linear radially connected inductors of the second group of linear radially connected inductors 3-4-2-L, and the number of linear radially connected inductors of the second group of linear radially connected inductors 3-4-2-L is two times as large as the number of linear radially connected inductors of the first group of linear radially connected inductors 3-4-1-L. For example, the first group of linear radially connected inductors 3-4-1-L is opposite to the first group of extrusion guide protrude ridges 2-2-1 and the number of linear radially connected inductors of the first group of linear radially connected inductors 3-4-1-L is the same as the number of extrusion guide protrude ridges of the first group of extrusion guide protrude ridges 2-2-1. For example, the second group of linear radially connected inductors 3-4-2-L is opposite to the second group of extrusion guide protrude ridges 2-2-2 and the number of linear radially connected inductors of the second group of linear radially connected inductors 3-4-2-L is the same as the number of extrusion guide protrude ridges of the second group of extrusion guide protrude ridges 2-2-2. For example, the third group of linear radially connected inductors 3-4-3-L is opposite to the third group of extrusion guide protrude ridges 2-2-3 and the number of linear radially connected inductors of the third group of linear radially connected inductors 3-4-3-L is the same as the number of extrusion guide protrude ridges of the third group of extrusion guide protrude ridges 2-2-3. With reference to the distribution mode of the plurality of groups of extrusion guide protrude ridges 2-2-N, each group of linear radially connected inductors included in the plurality of groups of linear radially connected inductors 3-4-N-L are distributed in a staggered manner within each group and in a manner of equally dividing a circumference. For example, as illustrated in FIG. 6, the number of the linear radially connected inductors of the first group of linear radially connected inductors 3-4-1-L is three, the number of the linear radially connected inductors of the second group of linear radially connected inductors 3-4-2-L is six, and the number of the linear radially connected inductors of the third group of linear radially connected inductors 3-4-3-L is twelve. The plurality of groups of linear radially connected inductors 3-4-N-L can make the discharge amount of the discharge surfaces 3-2-N of the one group of closed-circle discharge rings 3-1-N more uniform.

For example, in other embodiments, the number of the linear radially connected inductors of the first group of linear radially connected inductors 3-4-1-L may be four. Accordingly, the number of the linear radially connected inductors of the second group of linear radially connected inductors 3-4-2-L may be six, and the number of the linear radially connected inductors of the third group of linear radially connected inductors 3-4-3-L may be sixteen.

It should be noted that "opposite position" in the embodiments of the present disclosure means that, for example, the axis of the orthographic projection of the first group of linear radially connected inductors 3-4-1-L in the direction perpendicular to the piston 13 coincides with the axis of the orthographic projection of the first group of extrusion guide protrude ridges 2-2-1 in the direction perpendicular to the piston 13, and the orthographic projection of the first group of linear radially connected inductors 3-4-1-L in the direction perpendicular to the piston 13 and the orthographic projection of the first group of extrusion guide protrude ridges 2-2-1 in the direction perpendicular to the piston 13 have the same shapes.

For example, as illustrated in FIG. 4 and FIG. 5B, the plurality of curved fixed support inductors 3-5-N include three curved fixed support inductors 3-5-N distributed in a manner of equally dividing a circumference. It should be noted that the shape "curved" is not absolute, and the curved fixed support inductor 3-5-N may be linear, which is not limited to the embodiments of the present disclosure. For example, the number of the plurality of curved fixed support inductors 3-5-N may be four, five, six, etc., and the present disclosure is not limited thereto. The plurality of curved fixed support inductors 3-5-N can play a role of impedance matching.

For example, as illustrated in FIG. 4 and FIG. 5B, both the thickness H31 and the width W33 of each fixed support inductor 3-5-N range from 1 mm to 9 mm. For example, the value of the thickness H31 of the curved fixed support inductor 3-5-N is 4 mm, and the value of the width W33 of the curved fixed support inductor 3-5-N is 4 mm. An included angle between two adjacent curved fixed support inductors of the plurality of curved fixed support inductors 3-5-N is 60 degrees. One end of each curved fixed support inductor of the plurality of curved fixed support inductors 3-5-N is connected with the second outermost discharge ring 3-1-3, and another end of each curved fixed support inductor of the plurality of curved fixed support inductors 3-5-N is arranged with a wire hole or a through hole and is fastened to the top portion 222 of the cylinder block or the bottom portion 122 of the cylinder head.

For example, in another embodiment, as illustrated in FIG. 4, in the case that the cylindrical feed connection port 3-3 is arranged at one of the crossing positions between the second outermost discharge ring 3-1-3 and the second group of linear radially connected inductors 3-4-2-L connected with the second outermost discharge ring 3-1-3, the cylindrical feed connection port 3-3 includes a cylinder with a threaded or a bayonet base or a plug-in interface, both the thickness H34 (as illustrated in FIG. 7) and the diameter of the cylindrical feed connection port 3-3 range from 3 mm to 10 mm. For example, the value of thickness of the cylindrical feed connection port 3-3 is 4 mm, and the value of diameter of the cylindrical feed connection port 3-3 is 5 mm. The first group of linear radially connected inductors 3-4-1-L are communicated with the one group of closed-circle discharge rings 3-1-N and cross at a center of the one group of closed-circle discharge rings 3-1-N.

Figure 8:
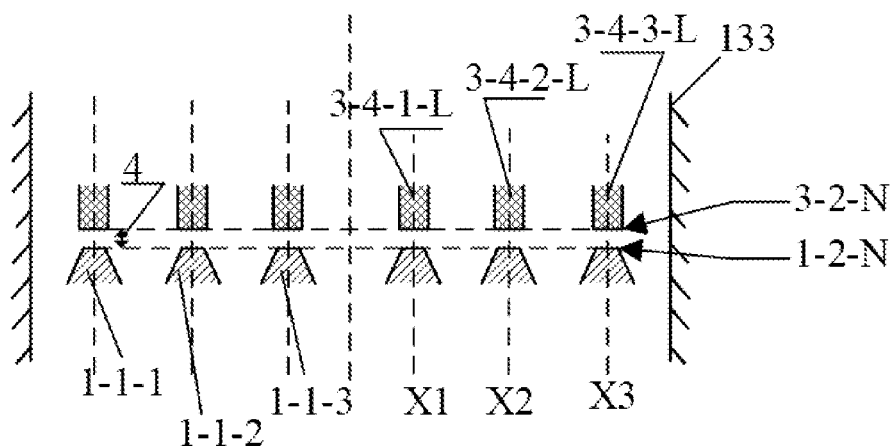
FIG. 8 is a schematic diagram of a corresponding relationship between a movement electrode and a fixed electrode provided by at least one embodiment of the present disclosure.

For example, as illustrated in FIG. 8, the variable interval discharge region 4 is arranged between the discharge surface 1-2-1 of the first innermost discharge ring 1-1-1 and the discharge surface 3-2-1 of the second innermost discharge ring 3-1-1, that is, between the discharge surfaces 3-2-N of the one group of closed-circle discharge rings 3-1-N and the discharge surfaces 1-1-N of the at least one group of open discharge rings 1-1-N. For example, the shape of at least one first discharge electrode is the same as the shape of the fixed electrode 3, and the axis of the shape of the at least one first discharge electrode is coincident with the axis of the shape of the fixed electrode 3. The shape of at least one second discharge electrode is the same as the shape of the movement electrode 1, and the axis of the shape of the at least one second discharge electrode is coincident with the axis of the shape of the f movement electrode 1. For example, the upper surface of the second innermost discharge ring 3-1-1 is parallel to the upper narrower surface of the first innermost discharge ring 1-1-1, and the second innermost discharge ring 3-1-1 is aligned with the center line X1 of the first innermost discharge ring 1-1-1. For example, the upper surface of the second intermediate discharge ring 3-1-2 is parallel to the upper narrower surface of the first intermediate discharge ring 1-1-2, and the second intermediate discharge ring 3-1-2 is aligned with the center line X2 of the first intermediate discharge ring 1-1-2. For example, the upper surface of the second outermost discharge ring 3-1-3 is parallel to the upper narrower surface of the first outermost discharge ring 1-1-3, and the second outermost discharge ring 3-1-3 is aligned with the center line X3 of the first outermost discharge ring 1-1-3.

Figure 13:
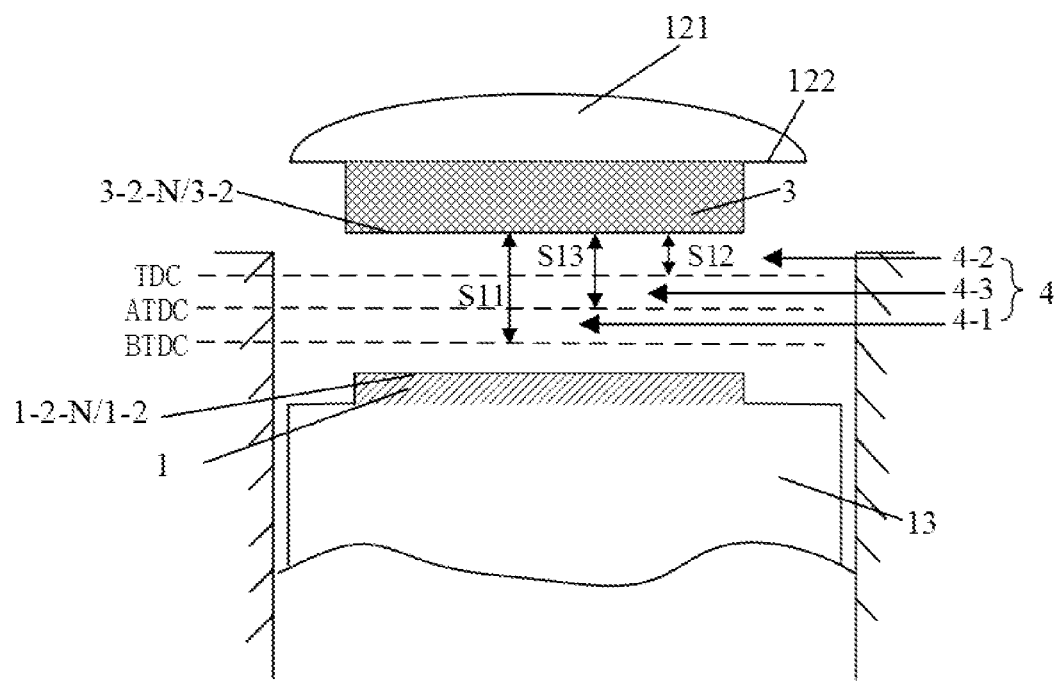
FIG. 13 is a schematic diagram of a variable discharge interval provided by at least one embodiment of the present disclosure.

For example, FIG. 13 is a schematic diagram of a variable discharge interval provided by an embodiment of the present disclosure. As illustrated in FIG. 13, according to different positions or moments in the case where the discharge surface 1-2-1 of the first innermost discharge ring 1-1-1 moves with the piston 13, the variable interval discharge region 4 is further subdivided into a first pre-ionization region 4-1, a second ionization region 4-2, and a third enhanced combustion region 4-3. The length S11 of the first pre-ionization region 4-1 along the direction perpendicular to the discharge surface 1-2-1 of the first innermost discharge ring 1-1-1 is greater than the length S13 of the third enhanced combustion region 4-3 along the direction perpendicular to the discharge surface 1-2-1 of the first innermost discharge ring 1-1-1, and the length S13 is greater than the length S12 of the second ionization region 4-2 along the discharge surface perpendicular to the discharge surface 1-2-1 of the first innermost discharge ring 1-1-1. The length S11 of the first pre-ionization region 4-1 in the direction perpendicular to the discharge surface 1-2-1 of the first innermost discharge ring 1-1-1 ranges from 0.2 mm to 1 mm, for example, the value of the length S11 is 0.3 mm. The length S12 of the second ionization region 4-2 in the direction perpendicular to the discharge surface 1-2-1 of the first innermost discharge ring 1-1-1 ranges from 0.02 mm to 0.09 mm, for example, the value of the length S12 is 0.03 mm. The length S13 of the third enhanced combustion region 4-3 in the direction perpendicular to the discharge surface 1-2-1 of the first innermost discharge ring 1-1-1 ranges from 0.1 mm to 0.5 mm, for example, the value of the length S13 is 0.15 mm. The above dimensional design can meet the requirement that for the full-load section of the engine, multiple homogeneous ignition, and ignition under an air pressure of 7 MPa can be reliably realized. Subsequently, the combustion process at different intervals will be described in detail.

For example, in the case that the value of the diameter of the piston 13 is 20 mm or less, the number of the movement electrodes 1 and the number of fixed electrodes 3 may be reduced for design, which will be described in detail later.

Figure 9A:
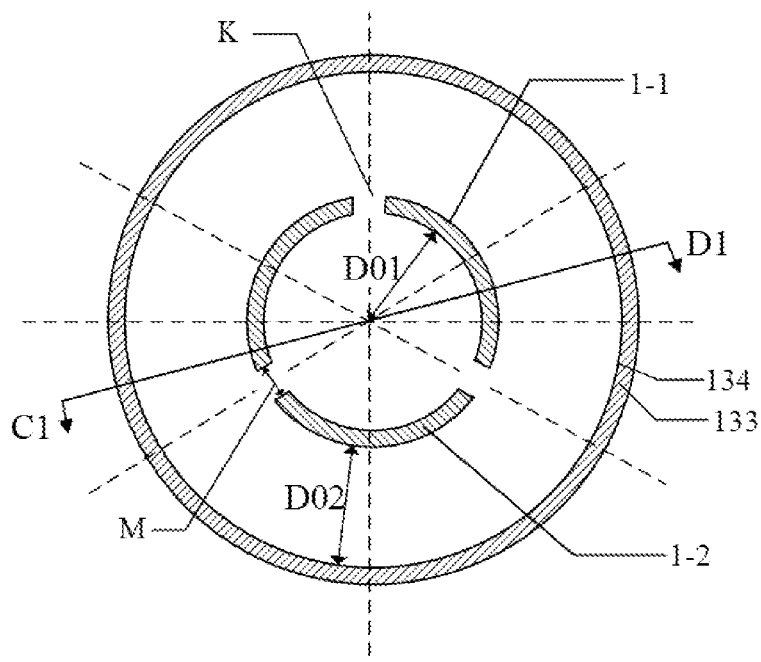
FIG. 9A is a schematic diagram of another movement electrode provided by at least one embodiment of the present disclosure.
Figure 9B:
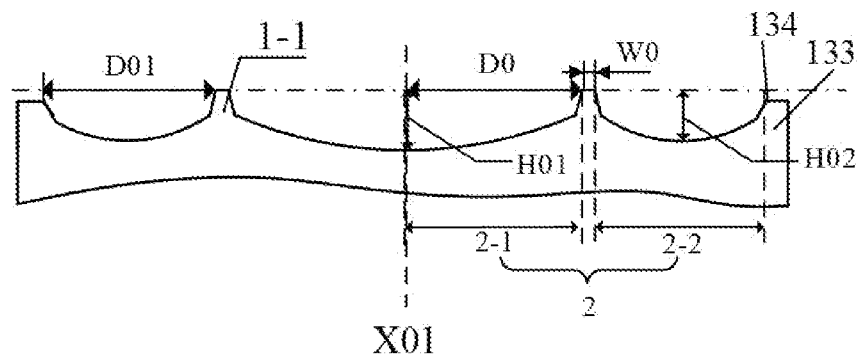
FIG. 9B is a schematic cross-sectional view of the movement electrode provided by at least one embodiment of the present disclosure taken along the line C1-D1 in FIG. 9A.

For example, FIG. 9A is a schematic diagram of another movement electrode provided by at least one embodiment of the present disclosure; FIG. 9B is a schematic cross-sectional view of the movement electrode taken along the line C1-D1 in FIG. 9A. As illustrated in FIG. 9A and FIG. 9B, the movement electrode 1 includes one open discharge ring 1-1. An upper surface of the one open discharge ring 1-1 includes a discharge surface 1-2, that is, the end surface of the open discharge ring 1-1 close to the fixed electrode 3. The width W0 of the discharge surface 1-2 of the one open discharge ring 1-1 in the radial direction of the one open discharge ring 1-1 ranges from 0.3 mm to 2 mm. The one open discharge ring 1-1 includes three notches K. The three notches K are distributed on the one open discharge ring 1-1 in a manner of equally dividing a circumference, and an included angle between two adjacent notches K is 60 degrees. The width M of each of the three notches K ranges from 2 mm to 5 mm. The depth of the inner side of the one open discharge ring 1-1 is H01, and the depth from the outer side of the one open discharge ring 1-1 to the inner edge 134 of the top land of the piston is H02, and the depth H01 of the inner side of the one open discharge ring 1-1 is greater the depth H02 from the outer side of the one open discharge ring 1-1 to the inner edge 134 of the top land of the piston. A distance D0 from an inner edge of the one open discharge ring 1-1 to the geometric center X01 of the top surface of the piston ranges from 1 mm to 3 mm. A distance D01 from the outer edge of the one open discharge ring 1-1 to the inner edge 134 of the top land of the piston is equal to the distance D0 from the inner edge of the one open discharge ring 1-1 to the geometric center X01 of the top surface of the piston.

For example, as illustrated in FIG. 9A and FIG. 9B, the distributed multi-cavity structure combustor 2 includes a distributed two-cavity structure, and the distributed two-cavity structure includes a combustion chamber main cavity 2-1 and a combustion chamber auxiliary cavity 2-2. The combustion chamber main cavity 2-1 includes a spherical concave region on the inner side of the one open discharge ring 1-1, and a diameter of the combustion chamber main cavity 2-1 ranges from 2 mm to 5 mm (for example, the diameter of the combustion chamber main cavity 2-1 of the combustion chamber is two times as large as the distance D0 between the inner side of the one open discharge ring 1-1 and the geometric center X01 of the top surface of the piston). The maximum depth H01 of the combustion chamber main cavity 2-1 (i.e., the depth of the inner side the one open discharge ring 1-1) ranges from 0.2 mm to 2 mm. The combustion chamber auxiliary cavity 2-2 includes a spherical concave region from the outer side of the one open discharge ring 1-1 to the inner edge 134 of the top land. The concave depth H02 of the combustion chamber auxiliary chamber main cavity 2-2 (i.e., the depth from the outer side of the one open discharge ring 1-1 to the inner edge 134 of the top land of the piston) is 5%-40% of the maximum depth H01 of the combustion chamber combustion chamber main cavity 1-1.

Figure 10A:
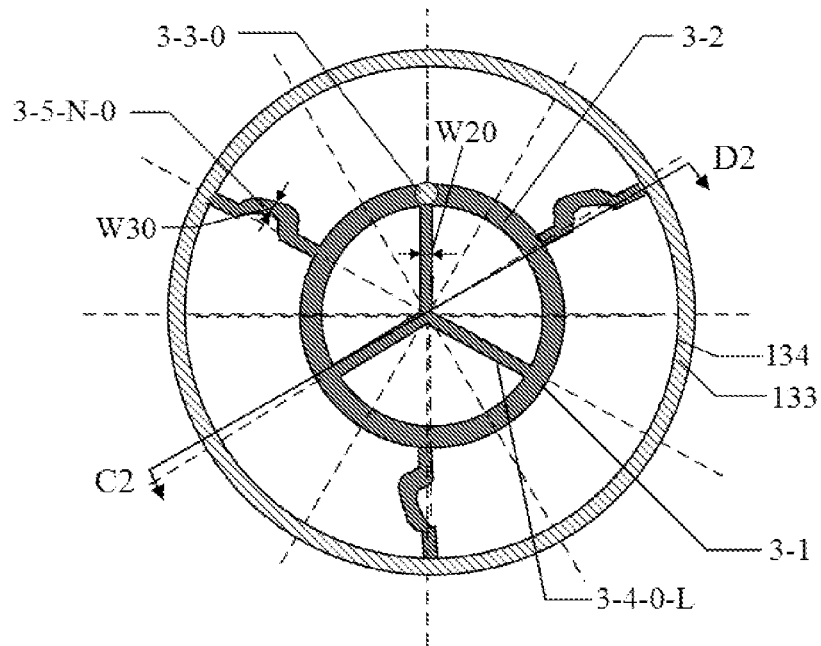
FIG. 10A is a schematic diagram of another fixed electrode provided by at least one embodiment of the present disclosure.
Figure 10B:
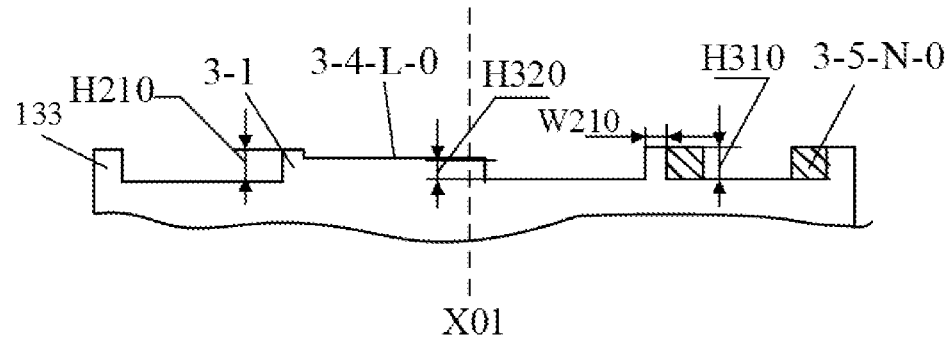
FIG. 10B is a schematic cross-sectional view of the fixed electrode provided by at least one embodiment of the present disclosure taken along the line C2-D2 in FIG. 10A.
Figure 11A:
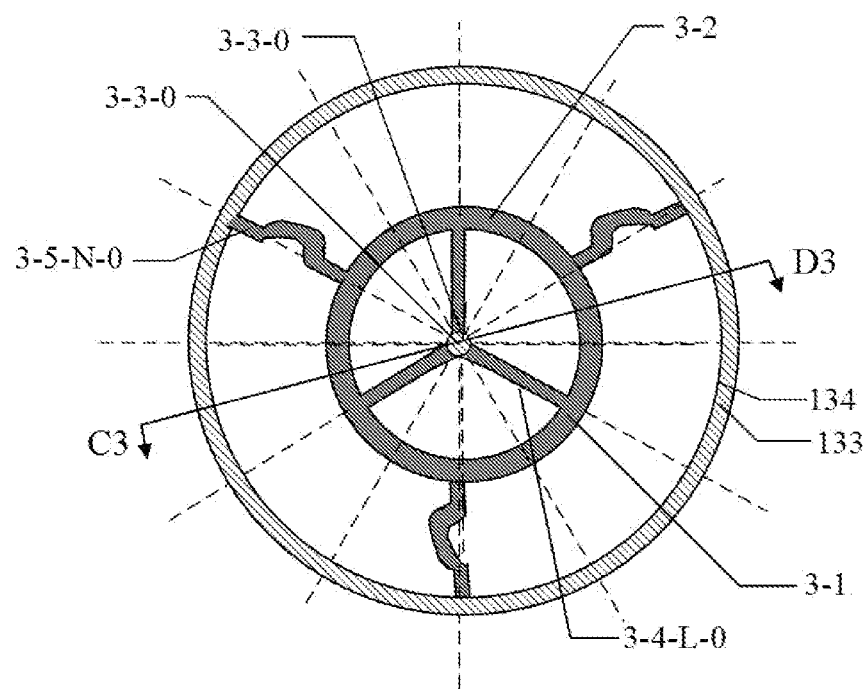
FIG. 11A is a schematic diagram of still another fixed electrode provided by at least one embodiment of the present disclosure.
Figure 11B:
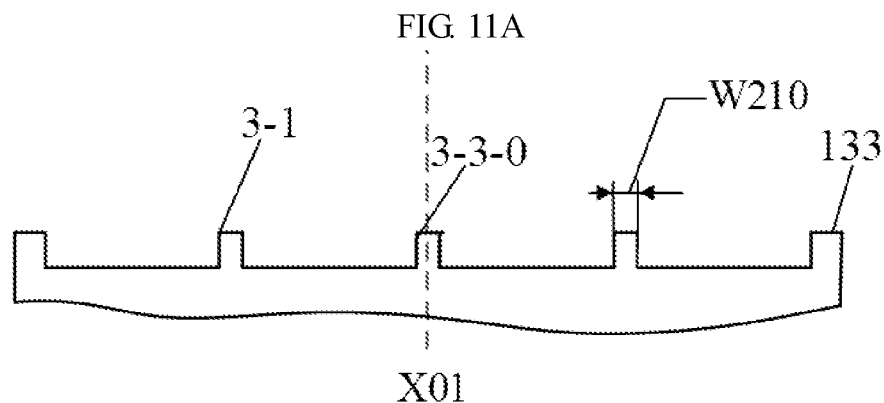
FIG. 11B is a schematic cross-sectional view of the fixed electrode provided by at least one embodiment of the present disclosure taken along the line C3-D3 in FIG. 11A.

FIG. 10A is a schematic diagram of another fixed electrode provided by at least one embodiment of the present disclosure; FIG. 10B is a schematic cross-sectional view of the fixed electrode provided by at least one embodiment of the present disclosure taken along the C2-D2 line in FIG. 10A. FIG. 11A is a schematic diagram of another fixed electrode provided by at least one embodiment of the present disclosure; FIG. 11B is a schematic cross-sectional view of the fixed electrode provided by at least one embodiment of the present disclosure taken along the line C3-D3 in FIG. 11A.

For example, as illustrated in FIG. 10A and FIG. 10B, the fixed electrode 3 includes one closed-circle discharge ring 3-1. The shape of the one closed-circle discharge ring 3-1 is the same as the shape of the one open discharge ring 3-2, and the axis of the shape of the one closed-circle discharge ring 3-1 is coincident with the axis of the shape of the one open discharge ring 3-2. The thickness H210 of the one closed-circle discharge ring 3-1 ranges from 1 mm to 10 mm. A cross section of the one closed-circle discharge ring 3-1 is in a rectangular shape, thereby increasing the capacity of the closed-circle discharge ring 3-1 to bear compressive stress. An end surface of a closed-circle discharge ring 3-1 facing a discharge face 1-2 of the one open discharge ring 1-1 includes a discharge surface 3-2. The width W210 of the discharge surface 3-2 of the one closed-circle discharge ring 3-1 ranges from 0.2 mm to 2 mm.

For example, in other embodiments, the cross section of the one closed-circle discharge ring 3-1 may be in a trapezoidal shape, a square shape, etc., and the embodiments of the present disclosure are not limited thereto.

For example, the piston discharge structure further includes at least one cylindrical feed connection port, a plurality of linear radially connected inductors, and a plurality of curved fixed support inductors. As illustrated in FIG. 10A and FIG. 11A, the piston discharge structure further includes a cylindrical feed connection port 3-3-0, a plurality of linear radially connected inductors 3-4-0-L, and a plurality of curved fixed support inductors 3-5-N-0. As illustrated in FIG. 10A, the number of the linear radially connected inductors 3-4-0-L is three, and the number of the curved fixed support inductors 3-5-N-0 is three. For example, the included angle between two adjacent linear radially connected inductors 3-4-0-L is 60 degrees. For example, the included angle between two adjacent curved fixed support inductors 3-5-N-0 is 60 degrees. For example, the linear radially connected inductors 3-4-0-L are distributed on the inner side of the one closed-circle discharge ring 3-1 in a manner of equally dividing a circumference. For example, the curved fixed support inductors 3-5-N-0 are distributed on the top portion 222 of the cylinder block or the bottom portion 122 of the cylinder head in a manner of equally dividing a circumference. For example, one end of the curved fixed support inductor 3-5-N-0 is connected with the one closed-circle discharge ring 3-1, and another end of the curved fixed support inductor 3-5-N-0 is arranged with a wire hole or a through hole and is fastened to the top portion 222 of the cylinder block or the bottom portion 122 of the cylinder head.

For example, in other embodiments, the number of the plurality of linear radially connected inductors 3-4-0-L may be four or five, etc., and the number of the curved fixed support inductors 3-5-N-0 may be four or five, etc. For example, the number of the cylindrical feed connection ports 3-3-0 may be multiple, such as two, three, etc.

For example, as illustrated in FIG. 10A, the cylindrical feed connection port 3-3-0 is arranged at one intersection position of the one closed-circle discharge ring 3-1 and the linear radially connected inductors 3-4-0-L, and the cylindrical feed connection port 3-3-0 is a threaded or a bayonet base or a plug-in interface. For example, the linear radially connected inductors 3-4-0-L cross at the center of the one closed-circle discharge ring 3-1.

For example, in another embodiment, as illustrated in FIG. 11A, in the case that the cylindrical feed connection port 3-3-0 is arranged at the center of the one closed-circle discharge ring 3-1, the cylindrical feed connection port 3-3-0 is a cylinder with a screw thread, a bayonet base or a plug interface. The linear radially connected inductors 3-4-0-L are distributed between the one closed-circle discharge ring 3-1 and a cylindrical feed connection port 3-3-0 in a manner of equally dividing a circumference, and the linear radially connected inductors 3-4-0-L communicate with the cylindrical feed connection port 3-3-0 and the one closed-circle discharge ring 3-1.

For example, as illustrated in FIG. 11B, the thickness of the cylindrical feed connection port 3-3-0 is equal to the thickness H210 of the one closed-circle discharge ring 3-1, and the diameter of the cylindrical feed connection port 3-3-0 ranges from 2 mm to 3 mm.

For example, as illustrated in FIG. 10A and FIG. 10B, the thickness H310 of each of the linear radially connected inductors 3-4-0-L is 60%-85% of the thickness H210 of the one closed-circle discharge ring 3-1, and the width W20 of each linear radially connected inductor 3-4-0-L ranges from 1 mm to 3 mm.

For example, as illustrated in FIG. 10A and FIG. 10B, the thickness H310 of each of the curved fixed support inductors 3-5-N-0 is equal to the thickness H210 of the one closed-circle discharge ring 3-1, and the width W30 of each of the curved fixed support inductors 3-5-N-0 ranges from 1 mm to 9 mm.

Figure 12:
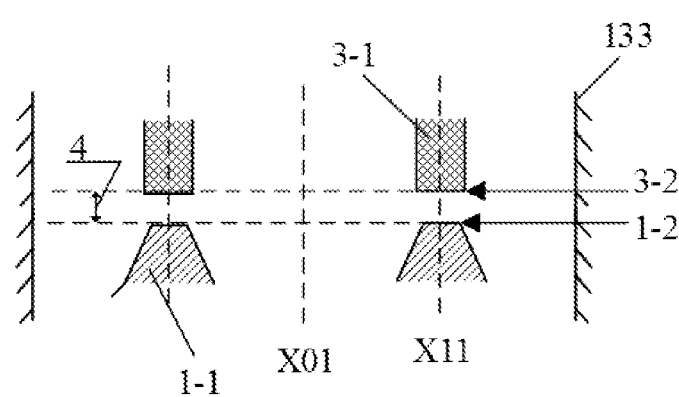
FIG. 12 is a schematic diagram of a corresponding relationship between a movement electrode and a fixed electrode provided by at least one embodiment of the present disclosure.

For example, FIG. 12 is a schematic diagram of a corresponding relationship between a movement electrode and a fixed electrode provided by at least one embodiment of the present disclosure. As illustrated in FIG. 12, the closed-circle discharge ring 3-1 has the same geometric center as the one open discharge ring, and the variable interval discharge region 4 is arranged between the discharge surface 1-2 of the one open discharge ring 1-1 and the discharge surface 3-2 of the one closed-circle discharge ring 3-1 of the fixed electrode 3. For example, the shape of the one open discharge ring 1-1 is the same as the shape of the one ring discharge ring 3-1, and the axis of the shape of the one open discharge ring 1-1 is coincident with the axis of the shape of the one ring discharge ring 3-1. For example, the discharge surface 1-2 of the one open discharge ring 1-1 is parallel to the discharge surface 3-2 of the one closed-circle discharge ring 3-1, and a center line of the discharge surface 1-2 of the one open discharge ring 1-1 is aligned with the center line X11 of the discharge surface 3-2 of the one closed-circle discharge ring 3-1.

For example, as illustrated in FIG. 13, the variable interval discharge region 4 is further subdivided into a first pre-ionization region 4-1, a second ionization region 4-2, and a third enhanced combustion region 4-3 according to different positions or moments in the case where the discharge surface 1-2 of the one open discharge ring 1-1 of the movement electrode 1 moves with the piston 13. The length S11 of the first pre-ionization region 4-1 in the direction perpendicular to the discharge surface 1-2 of the one open discharge ring 1-1 is greater than the length S13 of the third intensified combustion region 4-3 in the direction perpendicular to the discharge surface 1-2 of the one open discharge ring 1-1, and the length S13 is greater than the length S12 of the second ionization region 4-2 in the direction perpendicular to the discharge surface 1-2 of the one open discharge ring 1-1. The length S11 of the first pre-ionization region 4-1 in the direction perpendicular to the discharge surface 1-2 of one open discharge ring 1-1 ranges from 0.2 mm to 1 mm, for example, the value of the length S11 is 0.3 mm. The length S12 of the second ionization region 4-2 in the direction perpendicular to the discharge surface 1-2 of one open discharge ring 1-1 is ranges from 0.02 mm-0.09 mm, for example, the value of the length S12 is 0.03 mm. The length S13 of the third enhanced combustion region 4-3 in the direction perpendicular to the discharge surface 1-2 of the one open discharge ring 1-1 ranges from 0.1 mm to 0.5 mm, for example, the value of the length S13 is 0.15 mm. The above dimensional design can meet the requirement that for the full-load section of the engine, multiple homogeneous ignition and ignition under an air pressure of 7 MPa can be reliably realized. Subsequently, the combustion process at different intervals will be described in detail.

To facilitate understanding of the embodiments of the present disclosure, the above technical scheme and the improvement effect of the technical scheme on the combustion process of the engine are provided. Therefore, the working process of the piston discharge structure will be further explained, but it does not constitute a limitation on the present disclosure.

Embodiments of the present disclosure are mainly based on basic combustion laws and gas discharge principles. As illustrated below:

1) Law of Mass Action:

$$k_1 A + k_2 B \rightarrow k_3 C + k_4 E \tag{1}$$

In formula (1), $k_n$ represents a quantitative factor, A represents a combustion substance, B represents an oxide, and C and E represent combustion products. The forward chemical reaction rate and the reverse chemical reaction rate can be expressed by the consumption of fuel and oxygen per unit time and per volume. The forward chemical reaction rate and the reverse chemical reaction rate are also proportional to the concentration of reactants.

2) Arrenius Law:

$$G = g_0 \exp(-E/RT) \tag{2}$$

In formula (2), G represents reaction rate m³/(s·mol), $g_0$ represents collision frequency or order factor m³/(s·mol), E represents reactant activation energy kj/mol, R represents universal gas constant $8.314 \times 10^3$ kj/(mol·K), T represents temperature K, and the chemical reaction rate is exponentially related to reactant activation energy and temperature under the condition of uniform concentration.

3) Paschen Law:

$$V_s = f(pd) \frac{Bpd}{\ln\left(\frac{Apd}{\ln(1/y)}\right)} \tag{3}$$

In formula (3), $V_s$ represents breakdown voltage, P represents discharge pressure of gas discharge, d represents discharge distance of gas discharge, and A, B, and y represent coefficients related to gas properties, electrode material of gas discharge, electrode shape, and electrode structure (electric field distribution) of gas discharge, respectively. According to Paschen law, the breakdown voltage Vs of gas ionization is a function of the product pd. In the case where the electrode material, electrode shape, and electrode structure are determined, even if p and d change, as long as the product pd remains unchanged, the breakdown voltage Vs will remain unchanged, which is applicable to a pressure range of 10 MPa.

For example, as illustrated in FIG. 1A and FIG. 13, according to different positions or moments during moving of the piston 13 of the engine, in the case where the discharge surfaces 1-2-N of the at least one group of open discharge rings 1-1-N of the movement electrode 1 (or the discharge surfaces 1-2 of the one open discharge ring 1-1) move to a set position before top dead center (BTDC), and a wide distance is arranged between the discharge surfaces 1-2-N and the discharge surface 3-2-N, the discharge surfaces 1-2-N begin to an apply weak discharge energy, thereby forming a weak electromagnetic energy field. At this stage, the low-pressure premixed gas in the incompletely compressed engine is pre-ionized at first so as to improve the movement activity of gas molecules, and the movement electrode 1 gradually generates extrusion turbulence during the movement. In the case where the discharge surfaces 1-2-N move to the position at top dead center (TDC) and a set extremely narrow gap is formed between the discharge surfaces 1-2-N and the discharge surfaces 3-2-N of the one group of closed-circle discharge rings 3-1-N of the fixed electrode 3 (or the discharge surface 3-2 of the one closed-circle discharge ring 3-1), the discharge energy gradually increases with the increase of air pressure in the engine and reaches its peak value, thereby forming an electromagnetic energy field with a high intensity. The compressed high-pressure premixed gas in the extremely narrow gap in the engine is ionized, thus generating a multi-ring and multi-section plasma cloud (body) with a large volume. Under this case, a large range of reliable multiple homogeneous fires is realized, and the extrusion turbulence is also the strongest, which helps the plasma cloud exciting the rest of the compressed gas outside the discharge region (i.e., between the discharge surfaces 1-2-N and the discharge surfaces 3-2-N) to start burning, and provides a double optimal condition of "self-ignition temperature+plasma cloud excitation" which is more favorable than a single condition of "self-ignition temperature" for combustion development. In the middle stage and later stage of the combustion development of the engine, in the case where the discharge surfaces 1-2-N leave the position at top dead center (TDC) and starts to move to a set position after top dead center (ATDC), the discharge surfaces 1-2-N continue maintaining a proper discharge energy, strengthen combustion, and maximize the combustion efficiency, burnout rate and effective work. Until the discharge surface 1-2-N leave the set position after top dead center (ATDC) and the distance between the discharge surface 1-2-N and the discharge surface 3-2-N is widened to the set value again, the discharge is removed (i.e., the electric energy is no longer supplied to the feed lead-in terminal 17), and the fine management of the whole intermittent (pulse) combustion process is ended. The whole working process is specifically divided into four steps (stages): wide-interval pre-ionization, narrow-gap ionization, plasma cloud excitation, and medium-interval intensified combustion (referred to as pre-ionization, ionization, cloud excitation and enhanced combustion), as detailed below.

In the pre-ionization stage, the pre-ionization is controlled in advance, which greatly improves the movement activity of the premixed gas molecules and makes full preparations for the subsequent ionization. In the case where the discharge surfaces 1-2-N of the at least one group of open discharge rings 1-1-N (or the discharge surface 1-2 of the one open discharge ring 1-1) (i.e., the top surface 131 of the piston) of the movement electrode 1 moves to a set position before top dead center (BTDC), and the variable interval discharge region 4 includes the first pre-ionization region 4-1, according to a set initial discharge time (different initial discharge times t0 can be set according to the rarefaction of the premixed gas), a low pre-ionization electric energy (e.g., initial discharge energy j which is the product of the voltage v and the current i) is applied to the fixed electrode 3 (i.e., the electric energy is supplied to the feed lead-in terminal 17) to form an electromagnetic energy field with a low-intensity. First, the compressed low-pressure premixed gas is pre-ionized in the first pre-ionization region 4-1, the number of active molecules, average kinetic energy, effective collision frequency, and collision times are increased, and the discharge energy is gradually increased according to a set change rate. The set discharge structure can ensure the effects of large-scale (substantially covering the whole combustion chamber) pre-ionization and subsequent ionization, excitation, and strengthening. During the movement of the movement electrode 1, the combustion chamber main cavity 2-1 and the auxiliary chamber main cavity 2-2 of the distributed multi-chamber structure combustion chamber 2 gradually form extrusion turbulence. At the initial discharge time t0, the air pressure (p) in the first pre-ionization region 4-1 is low and the distance S11 (i.e., the distance d in formula (3)) is large, and the air pressure distance product (pd) (i.e., the breakdown voltage Vs) is a transient constant value which does not change rapidly with the dynamic changes of air pressure surge and distance drop during the compression. The three data, i.e. the initial discharge time to, the initial discharge energy j, and the discharge energy change rate dj/dt, are very important, especially the breakdown voltage Vs in j which is the key to ensure that only the kinetic activity of gas molecules is activated without random ignition in the pre-ionization stage, and is the key to reliably realize the next ionization.

In the ionization stage, multiple homogeneous ignition is realized, which provides better conditions for the start and development of combustion. In the case where the discharge surfaces 1-2-N of the at least one group of open discharge rings 1-1-N of the movement electrode 1 (or the discharge surface 1-2 of one open discharge ring 1-1) move to the position at top dead center (TDC) position and the variable interval discharge region 4 includes the second pre-ionization region 4-2, the discharge energy on the fixed electrode 3 is increased to a certain set peak value (different peaks are set according to the load) to form an electromagnetic energy field with a high-intensity. The fully compressed high-pressure premixed gas in the second pre-ionization area 4-2 generates a multi-ring, multi-segment, and large-volume plasma cloud (body) in the extremely narrow gap with a specific shape (as illustrated in FIG. 2, the movement electrode 1 has a multi-ring and multi-segment shape), thus realizing reliable multiple homogeneous ignition, and the ignition range (or volume), and uniformity of the ignition, which are obviously better than those of ignition by lighting and compression ignition. Under this case, the unburned premixed gas distributed in the combustion chamber main cavity 2-1 and the auxiliary chamber main cavity 2-2 of the combustion chamber is wrapped by a plurality of layers of the plasma cloud, which provides a double optimal condition of "self-ignition temperature+plasma cloud excitation" which is more favorable than a single condition of "self-ignition temperature" for the start and development of the combustion. Under this case, the extrusion turbulence reaches the highest intensity, which helps the start and development of the combustion. The second pre-ionization region 4-2 and the non-ionization region between the discharge surface 3-2-N of the one group of closed-circle discharge rings 3-1-N of the fixed electrode 3 (or the discharge surface 3-2 of the one closed-circle discharge ring 3-1) and the opposite extrusion guide protrusion 2-1-1 and the opposite guide protrude ridge 2-2-N are all under the action of strong electro-magnetic energy field, thereby accelerating the movement speed of ions in the ignited flame and driving neutral particles to participate in the movement to form new turbulence, which is more conducive to the start and development of combustion. Under this case, the air pressure in the second pre-ionization region 4-2 is very high (e.g., reaching the MPa magnitude), the distance d of the second pre-ionization region 4-2 is very narrow (e.g., μs magnitude), the air pressure distance product (pd) (i.e., the breakdown voltage Vs) is basically stable, and the energy required for ionization increases but the breakdown voltage Vs remains unchanged. According to the ionization gap value set by the present disclosure, reliable ionization of high-pressure premixed gas can be ensured within the range of 10 MPa magnitude, and the design requirements of a novel engine can be met.

In the excitation stage, the homogeneous combustion is realized. Each segment in the multi-ring and multi-segment large-volume plasma cloud (body) radiates light energy, ray energy, electromagnetic energy, heat energy, etc. to the periphery of each segment. In the case where the discharge surfaces 1-2-N of the at least one group of open discharge rings 1-1-N of the movement electrode 1 (or the discharge surface 1-2 of the one open discharge ring 1-1) move to the position after top dead center (BTDC), and the variable interval discharge region 4 includes the third pre-ionization region 4-3, the discharge surfaces wraps the plasma cloud between the discharge surfaces 3-2-N and the unburned high-pressure premixed gas (occupying almost the whole region of the combustion chamber) in the combustion chamber main cavity 2-1 and the combustion chamber auxiliary cavity 2-2, and stimulates the start and development of combustion under the dual action of "self-ignition temperature+plasma cloud excitation". The fitting of piston discharge structure and distributed multi-cavity combustion chamber 2 makes the distance of excitation (radiation) almost equal everywhere. Therefore, on the basis of good multiple homogeneous ignition, the uniformity of combustion is obviously better than the uniformity of premixed combustion of ignition by lighting and diffusion combustion of compression combustion, and basically realizes homogeneous combustion. The flow guide protrusion 2-1-1 and flow guiding protrude ridges 2-2-N in the distributed multi-cavity combustion chamber 2 form strong extrusion turbulence and cross flow. The complex "labyrinth" cavity wall of the distributed multi-cavity combustion chamber 2 increases the frequency of colliding and turning of the gas molecules. The turbulence formed by neutral particles driven by ion acceleration under the action of cavity electromagnetic energy field will be further mixed with unsteady gas medium field to counteract the adverse effects of dynamic changes such as air pressure, temperature, molecular density, and oxygen concentration, destroy the formation of high energy density (sub-vortex cluster) vortex clusters, promote combustion, and meanwhile effectively avoid the risk of deflagration.

In the intensification stage, the whole process control is further completed on the basis of advance and global control, and the combustion efficiency, burnout rate, and effective work are greatly improved. After the start of combustion, the engine is not allowed to develop freely after ignition by lighting or compression ignition, instead, proper discharge energy is continuously applied in the middle stage and the end stage of combustion development so as to maintain the function of electromagnetic energy field, strengthen the ionization degree of combustion flame, continue the process of ion acceleration which drives neutral particles to form new turbulence, homogenize the distribution of molecular density and oxygen concentration of unburned premixed gas, enhance combustion, maximize combustion efficiency and burnout rate, and enhance effective work. In the case where the piston 13 leaves the set position after top dead center (ATDC), or at a certain time after the start of the power stroke, the discharge energy is removed (that is, the electric energy is no longer supplied to the feed lead-in terminal 17), and a complete "cloud" excitation process is ended, and the subsequent stroke is continued and repeated.

The piston discharge structure for plasma cloud excitation homogeneous charge uniform combustion engine provided by the embodiments of the disclosure has the structural characteristics of variable discharge interval, multi-ring and multi-segment structure discharge region, distributed multi-cavity structure of a labyrinth type of combustion chamber and the like. The plug discharge structure adopts the combustion control mode of precise control throughout the whole region and the whole process, implements four steps of pre-ionization, ionization, cloud excitation, and enhanced combustion to precisely and finely controls the whole combustion process of the whole combustion chamber and the one intermittent (pulse) combustion, and utilizes radio frequency discharge to generate radiation effects of plasma cloud (body) such as light, rays, electromagnetism, and heat energy, which is called "cloud excitation", thereby reliably realizing multiple homogeneous ignition and combustion, greatly improving the combustion efficiency, the burnout rate, and the effective work. The piston discharge structure provided by at least one embodiment of the present disclosure can work reliably in the full load range and meet higher energy-saving emission standards. For example, the piston discharge structure is suitable for a plurality of fuels such as gasoline, diesel oil, fuel gas (CNG, LNG, LPG, etc.), dimethyl ether (DME), methanol ($CH_3OH$) and so on. In addition, the piston discharge structure has a compact structure, low cost, and is easy to be realized in engineering, and the piston discharge structure can be widely used in internal combustion engine manufacturing industry, especially to promote the large-scale application of new clean methanol fuel power combustion.

It should be noted that the specific design parameters involved in the embodiments of the present disclosure, such as the widths of the discharge rings, do not show tolerances for simplicity, and all the design parameters can fluctuate within their values, for example, fluctuating with a range of ±15%, or fluctuating with a range of ±25%.

The following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

The above are merely specific implementations of the present disclosure without limiting the protection scope of the present disclosure thereto. Any person familiar with the technical field can easily think of changes or substitutions within the technical scope disclosed in the present disclosure, which should be covered within the protection scope of the present disclosure. Therefore, the protection scope of the present disclosure should be based on the protection scope of the appended claims.

What is claimed is:

1. A piston discharge structure for a plasma cloud excitation engine, comprising:
   a movement electrode, provided at a top portion of a piston and comprising a first combination shape and a first movement electrode structure,
   a distributed multi-cavity combustion chamber, provided at the top portion of the piston,
   a fixed electrode, provided at a top portion of a cylinder block or a bottom portion of a cylinder head and comprising a second combination shape and a second structure, and
   a variable interval discharge region, defined by the movement electrode and the fixed electrode,
   wherein the fixed electrode is configured to be connected with an external power supply to form a voltage difference between the fixed electrode and the movement electrode,
   the movement electrode comprises at least one group of open discharge rings,
   the at least one group of open discharge rings is provided on the top portion of the piston and concentric with a geometric center of a top surface of the piston, and the top surface of the piston comprises an end surface, facing the fixed electrode, of the top portion of the piston, and
   the at least one group of open discharge rings comprises a first innermost discharge ring, a first outermost discharge ring, and at least one first intermediate discharge ring located between the first innermost discharge ring and the first outermost discharge ring, the first innermost discharge ring is provided with a first height, a cross section of the first innermost discharge ring along a radial direction is in a trapezoidal shape with an upper end and a lower end that is wider than the upper end, and an upper surface of the first innermost discharge ring comprises a discharge surface, an upper surface of the at least one first intermediate discharge ring comprises a discharge surface, an upper surface of the first outermost discharge ring comprises a discharge surface, the discharge surface of the first innermost discharge ring simultaneously serves as the top surface of the piston.

2. The piston discharge structure according to claim 1, wherein
   the movement electrode comprises at least one first discharge electrode, the at least one first discharge electrode is provided at the top portion of the piston and comprises the first combination shape and the first movement electrode structure, the at least one first discharge electrode is integrated with the piston, and the at least one first discharge electrode is configured to reciprocate with the piston, the piston is connected with a crank connection rod of the engine, and the piston is connected with a common ground through the crank connection rod of the engine, and a shape of the at least one first discharge electrode is the same as a shape of the fixed electrode, and an axis of the shape of the at least one first discharge electrode is coincident with an axis of the shape of the fixed electrode.

3. The piston discharge structure according to claim 1, wherein a plurality of discharge surfaces of the at least one group of open discharge rings are equal in height and parallel to each other.

4. The piston discharge structure according to claim 3, wherein a width of each open discharge ring of the at least one group of open discharge rings in the radial direction of the at least one group of open discharge rings ranges from 0.5 mm to 5 mm, a distance between an inner side of the first innermost discharge ring and the geometric center of the top surface of the piston ranges from 1 mm to 9.5 mm, and a distance from an outer side of the first innermost discharge ring to an inner side of a first intermediate discharge ring immediately adjacent to the first innermost discharge ring is two times as large as the distance between the inner side of the first innermost discharge ring and the geometric center of the top surface of the piston, a distance between two sides, facing each other, of two adjacent discharge rings of the at least one group of open discharge rings is two times as large as the distance between the inner side of the first innermost discharge ring and the geometric center of the top surface of the piston, and a distance between an outer side of the first outermost discharge ring and an inner edge of a top land of the piston is equal to the distance between the inner side of the first innermost discharge ring and the geometric center of the top surface of the piston.

5. The piston discharge structure according to claim 3, wherein the movement electrode further comprises a plurality of notches, and the plurality of notches are distributed on the at least one group of open discharge rings in a way of equally dividing a circumference, and a width of each notch of the plurality of notches ranges from 2 mm to 10 mm, a total number of at least one notch on each discharge ring of the at least one group of open discharge rings increases from the first innermost discharge ring to the first outermost discharge ring in a manner of one ring by one ring, and the at least one notch on the first innermost discharge ring is aligned along a radial direction of the first innermost discharge ring to the at least one notch on each discharge ring of the at least one group of open discharge rings, a first intermediate discharge ring immediately adjacent to the first innermost discharge ring is further provided with at least one notch staggered from the at least one notch on the first innermost discharge ring, and a total number of the at least one notch further provided on the first intermediate discharge ring immediately adjacent to the first innermost discharge ring is the same as a total number of the at least one notch on the first innermost discharge ring, and the first outermost discharge ring is further provided with at least one notch which is staggered from the at least one notch on the first intermediate discharge ring immediately adjacent to the first outermost discharge ring, and a total number of the at least one notch further provided on the first outermost discharge ring is the same as a total number of the at least one notch on the first intermediate discharge ring immediately adjacent to the first outermost discharge ring.

6. The piston discharge structure according to claim 5, wherein the distributed multi-cavity combustion chamber comprises a downwards concave region at an inner side of the first outermost discharge ring, between two adjacent discharge rings of the at least one group of open discharge rings, and at an outer side of the first outermost discharge ring, the distributed multi-cavity combustion chamber comprises a combustion chamber main cavity and a combustion chamber auxiliary cavity, and the combustion chamber main cavity comprises a flat w-shaped downwards concave region at the inner side of the first outermost discharge ring, a diameter of the downwards concave region of the combustion chamber main cavity is two times as large as the distance between the inner side of the first innermost discharge ring and the geometric center of the top surface of the piston, and a maximum depth of the combustion chamber main cavity ranges from 0.5 mm to 5 mm.

7. The piston discharge structure according to claim 6, wherein the piston discharge structure further comprises an extrusion flow guide protrusion and an extrusion flow guide protrude ridge, the extrusion flow guide protrusion is provided at a downwards concave downwards center of the combustion chamber main cavity, the concave downwards center coincides with the geometric center of the top surface of the piston, a cross section of the extrusion flow guide protrusion along a longitudinal direction is bell-shaped, an area of a bottom surface of the extrusion flow guide protrusion is 20%-50% of an area of a bottom surface of the combustion chamber main cavity, and a height of the extrusion flow guide protrusion is 50%-70% of a maximum depth of the combustion chamber main cavity.

8. The piston discharge structure according to claim 7, wherein the combustion chamber auxiliary cavity comprises a downwards concave region, which has a spherical shape along the radial direction of the first outermost discharge ring and is located between two adjacent discharge rings of the at least one group of open discharge rings and at the outer side of the first outermost discharge ring, and a concave depth of the combustion chamber auxiliary cavity gradually increases from a top land of the piston to the geometric center of the top surface of the piston, and the concave depth of the combustion chamber auxiliary cavity is 30%-70% of the maximum depth of the combustion chamber main cavity.

9. The piston discharge structure according to claim 7, wherein the extrusion flow guide protrude ridge is provided at a crossing position between the combustion chamber auxiliary cavity and the plurality of notches of the movement electrode, the extrusion flow guide protrude ridge is at a center of the crossing position, a length direction of the extrusion flow guide protrude ridge is along the radial direction of the at least one group of open discharge rings, and a width direction of the extrusion flow guide protrude ridge is along a circumferential direction of the at least one group of open discharge rings, the extrusion flow guide protrude ridge is provided with a bell-shaped cross section, a ridge height of the extrusion flow guide protrude ridge is 30%-70% of the maximum depth of the combustion chamber main cavity, both sides of the extrusion flow guide protrude ridge in the length direction of the of the extrusion flow guide protrude ridge are symmetrically or asymmetrically provided with guide slopes, and both sides of the extrusion flow guide protrude ridge in the width direction of the of the extrusion flow guide protrude ridge are symmetrically or asymmetrically provided with guide slopes.

10. The piston discharge structure according to claim 7, wherein
the fixed electrode comprises at least one second discharge electrode, and the least one second discharge electrode is fixed on the top portion of the cylinder block or the bottom portion of the cylinder head and comprises the second combination shape and the second structure, the at least one second discharge electrode is right above the movement electrode, and an end surface of the at least one second discharge electrode facing the discharge surface of the movement electrode comprises a discharge surface,
when the movement electrode is at a position at top dead center, a fixed gap is provided between the at least one second discharge electrode and the movement electrode in a direction perpendicular to the fixed electrode, and
the at least one second discharge electrode is configured to be connected with the external power supply, a shape of the at least one second discharge electrode is the same as a shape of the movement electrode, and an axis of the shape of the at least one second discharge electrode is coincident with an axis of the shape of the movement electrode.

11. The piston discharge structure according to claim 10, wherein
the fixed electrode comprises one group of closed-circle discharge rings, the one group of closed-circle discharge rings is geometrically centered with the at least one group of open discharge rings of the movement electrode and comprises a second innermost discharge ring, a second outermost discharge ring, and at least one second intermediate discharge ring located between the second innermost discharge ring and the second outermost discharge ring,
a thickness of the second innermost discharge ring ranges from 1 mm to 8 mm, a cross section of the second innermost discharge ring is in a rectangular shape, an end surface of the second innermost discharge ring facing the discharge surface of the first innermost discharge ring is provided as a discharge surface, and the end surface of the second innermost discharge ring is parallel to the upper surface of the first innermost discharge ring, center lines of the end surface of the second innermost discharge ring and the upper surface of the first innermost discharge ring are aligned with each other, and a width of the second innermost discharge ring ranges from 0.2 mm to 4 mm, and
the piston discharge structure further comprises at least one cylindrical feed connection port, a plurality of groups of linear radially connected inductors, and a plurality of curved fixed support inductors.

12. The piston discharge structure according to claim 11, wherein
when the at least one cylindrical feed connection port is provided at the center of the movement electrode, the at least one cylindrical feed connection port comprises a cylinder with a thread, a bayonet base or a plug-in interface, and both a thickness and a diameter of the at least one cylindrical feed connection port range from 3 mm to 10 mm,
a thickness of each linear radially connected inductor of the plurality of groups of linear radially connected inductors is 60%-85% of the thickness of the second innermost discharge ring, and the thickness of each linear radially connected inductor of the plurality of groups of linear radially connected inductors ranges from 1 mm to 9 mm,
the plurality of groups of linear radially connected inductors comprise a first group of linear radially connected inductors communicated with the at least one cylindrical feed connection port and the second innermost discharge ring, and at least one second group of linear radially connected inductors communicated with every two adjacent closed-circle discharge rings of the one group of closed-circle discharge rings, a total number of each group of linear radially connected inductors of the plurality of groups of linear radially connected inductors is different, numbers of groups of linear radially connected inductors of the plurality of groups of linear radially connected inductors are doubled group by group along a direction from the top land of the piston toward the geometric center direction of the top surface of the piston, and each group of linear radially connected inductors of the plurality of groups of linear radially connected inductors are distributed in a staggered manner within each group and in a manner of equally dividing a circumference,
a thickness and a width of each curved fixed support inductor of the plurality of curved fixed support inductors range from 1 mm to 9 mm, and the plurality of curved fixed support inductors are distributed in an equal circumferential way, one end of each curved fixed support inductor of the plurality of curved fixed support inductors is connected with the second outermost discharge ring, and another end of each curved fixed support inductor of the plurality of curved fixed support inductors is provided with a wire hole or a through hole and is fastened on the top portion of the cylinder block or the bottom portion of the cylinder head; or
in a case where the at least one cylindrical feed connection port is provided at one of crossing positions between the second outermost discharge ring and the second group of linear radially connected inductors connected with the second outermost discharge ring, the at least one cylindrical feed connection port is provided as a threaded or bayonet base or plug-in interface, and the plurality of groups of linear radially connected inductors are communicated with the one group of closed-circle discharge rings and cross at a center of the one group of closed-circle discharge rings, and
the plurality of curved fixed support inductors are distributed in a manner of equally dividing a circumference, one end of each curved fixed support inductor of the plurality of curved fixed support inductors is connected with the second outermost discharge ring, and another end of each curved fixed support inductor of the plurality of curved fixed support inductors is provided with a wire hole or a through hole and is fastened on the top portion of the cylinder block or the bottom portion of the cylinder head.

13. The piston discharge structure according to claim 12, wherein
the variable interval discharge region is provided between the discharge surface of the first innermost discharge ring and the discharge surface of the second innermost discharge ring, and
according to different positions or moments when the discharge surface of the first innermost discharge ring moves with the piston, the variable interval discharge region is further subdivided into a first pre-ionization region, a second ionization region, and a third enhanced combustion region, a length of the first pre-ionization region in a direction perpendicular to the discharge surface of the first innermost discharge ring is greater than a length of the third enhanced combustion region in the direction perpendicular to the discharge surface of the first innermost discharge ring, and the length of the third enhanced combustion region in the direction perpendicular to the discharge surface of the first innermost discharge ring is greater than a length of the second ionization region in the direction perpendicular to the discharge surface of the first innermost discharge ring.

14. The piston discharge structure according to claim 13, wherein
the length of the first pre-ionization region in the direction perpendicular to the discharge surface of the first innermost discharge ring ranges from 0.2 mm to 1 mm, the length of the second ionization region in the direction perpendicular to the discharge surface of the first innermost discharge ring ranges from 0.02 mm to 0.09 mm, and the length of the third enhanced combustion region in the direction perpendicular to the discharge surface of the first innermost discharge ring ranges from 0.1 mm to 0.5 mm.

15. A piston discharge structure for a plasma cloud excitation engine, comprising:
a movement electrode, provided at a top portion of a piston and comprising a first combination shape and a first movement electrode structure,
a distributed multi-cavity combustion chamber, provided at the top portion of the piston,
a fixed electrode, provided at a top portion of a cylinder block or a bottom portion of a cylinder head and comprising a second combination shape and a second structure, and
a variable interval discharge region, defined by the movement electrode and the fixed electrode,
wherein the fixed electrode is configured to be connected with an external power supply to form a voltage difference between the fixed electrode and the movement electrode,
when a diameter of the piston is less than or equal to 20 mm, the movement electrode comprises one open discharge ring, an upper surface of the one open discharge ring comprises a discharge surface, and a width of the discharge surface of the one open discharge ring along a radial direction of the open discharge ring ranges from 0.3 mm to 2 mm,
the one open discharge ring comprises three notches, the three notches are distributed on the open discharge ring in a manner of equally dividing a circumference, and a width of each notch of the three notches ranges from 2 mm to 5 mm, and
a distance between an inner side of the one open discharge ring and the geometric center of the top surface of the piston ranges from 1 mm to 3 mm, a distance between an outer side of the one open discharge ring and an inner edge of a top land of the piston is equal to a distance between the inner side of the one open discharge ring and the geometric center of the top surface of the piston, and the top surface of the piston comprises an end surface, facing the fixed electrode, of the top portion of the piston.

16. The piston discharge structure according to claim 15, wherein
the distributed multi-cavity combustion chamber is in a distributed two-cavity structure, and the distributed two-cavity structure comprises a combustion chamber main cavity and a combustion chamber auxiliary cavity,
the combustion chamber main cavity comprises a spherical downwards concave region at the inner side of the open discharge ring, a diameter of the combustion chamber main cavity ranges from 2 mm to 5 mm, and a maximum depth of the combustion chamber main cavity ranges from 0.2 mm to 2 mm, and
the combustion chamber auxiliary cavity comprises a downwards concave region with a spherical shape arranged from the outer side of the one open discharge ring to the inner edge of the top land, and a concave depth of the combustion chamber auxiliary cavity is 5%-40% of the maximum depth of the combustion chamber main cavity.

17. The piston discharge structure according to claim 15, wherein
the fixed electrode comprises one closed-circle discharge ring, the one closed-circle discharge ring has a same geometric center as the one open discharge ring, a thickness of the one closed-circle discharge ring ranges from 1 mm to 10 mm, a cross section of the one closed-circle discharge ring is in a rectangular shape, an end surface of the one closed-circle discharge ring facing the discharge surface of the one open discharge ring comprises a discharge surface, and a width of the discharge surface of the one closed-circle discharge ring ranges from 0.2 mm to 2 mm.

18. The piston discharge structure according to claim 17, wherein the piston discharge structure further comprises at least one cylindrical feed connection port, a plurality of linear radially connected inductors, and a plurality of curved fixed support inductors,
when the at least one cylindrical feed connection port is arranged at a center of the one closed-circle discharge ring, the at least one cylindrical feed connection port is a cylinder with a thread or a bayonet base or a plug-in interface, a thickness of each cylindrical feed connection port of the at least one cylindrical feed connection port is equal to the thickness of the one closed-circle discharge ring, a diameter of each cylindrical feed connection port of the at least one cylindrical feed connection port ranges from 2 mm to 3 mm,
a total number of the linear radially connected inductors is three or four, a thickness of each linear radially connected inductor of the plurality of the linear radially connected inductors is 60%-85% of the thickness of the one closed-circle discharge ring, a width of each linear radially connected inductor of the plurality of the linear radially connected inductors ranges from 1 mm to 3 mm, and the plurality of linear radially connected inductors are distributed between the one closed-circle discharge ring and the at least one cylindrical feed connection port in a manner of equally dividing a circumference, and the plurality of linear radially connected inductors are communicated with the at least one cylindrical feed connection port and the one closed-circle discharge ring, a total number of the curved fixed support inductors is three, a thickness of each curved fixed support inductor of the plurality of curved fixed support inductors is equal to the thickness of the one closed-circle discharge ring, a width of each of the plurality of curved fixed support inductors ranges from 1 mm to 9 mm, the plurality of curved fixed support inductors are distributed at the top portion of the cylinder block or the bottom portion of the cylinder head in a manner of equally dividing a circumference, one end of each curved fixed support inductor of the plurality of curved fixed support inductors is connected with the one closed-circle discharge ring, and another end of each curved fixed support inductor of the plurality of curved fixed support inductors is provided with a wire hole or a through hole and is fastened on the top portion of the cylinder block or the bottom portion of the cylinder head; or when the at least one cylindrical feed connection port is arranged at one of crossing positions between the one closed-circle discharge ring and the plurality of linear radially connected inductors, and the at least one cylindrical feed connection port comprises a threaded or a bayonet base or a plug-in interface, a total number of the plurality of linear radially connected inductors is three or four, and a total number of the plurality of linear radially connected inductors is distributed at the inner side of the one closed-circle discharge ring in a manner of equally dividing a circumference, and the plurality of linear radially connected inductors cross at the center of the one closed-circle discharge ring, and a total number of the plurality of curved fixed support inductors is three, and the plurality of curved fixed support inductors are distributed on the top portion of the cylinder block or the bottom portion of the cylinder head in a manner of equally dividing a circumference, one end of each curved fixed support inductor of the plurality of curved fixed support inductors is connected with the one closed-circle discharge ring, and another end of each curved fixed support inductor of the plurality of curved fixed support inductors is provided with a wire hole or a through hole and is fastened on the top portion of the cylinder block or the bottom portion of the cylinder head.

19. The piston discharge structure according to claim 17, wherein the variable interval discharge region comprises a variable interval discharge region between the discharge surface of the one open discharge ring of the movement electrode and the discharge surface of the one closed discharge ring of the fixed electrode, and according to different positions or moments when the discharge surface of the one open discharge ring of the movement electrode moves along with the piston, the variable interval discharge region is subdivided into a first pre-ionization region, a second ionization region, and a third enhanced combustion region, a length of the first pre-ionization region in a direction perpendicular to the discharge surface of the first innermost discharge ring is greater than a length of the third enhanced combustion region in the direction perpendicular to the discharge surface of the first innermost discharge ring, and the length of the third enhanced combustion region in the direction perpendicular to the discharge surface of the first innermost discharge ring is greater than a length of the second ionization region in the direction perpendicular to the discharge surface of the first innermost discharge ring.

20. The piston discharge structure according to claim 19, wherein a length of the first pre-ionization region in a direction perpendicular to the one open discharge ring of the movement electrode ranges from 0.2 mm to 1 mm, a length of the second ionization region in the direction perpendicular to the one open discharge ring of the movement electrode ranges from 0.02 mm to 1 mm, and a length of the third enhanced combustion region in the direction perpendicular to the one open discharge ring of the movement electrode ranges from 0.1 mm to 0.5 mm.

* * * * *